United States Patent
Rajagopal et al.

(10) Patent No.: US 12,254,765 B2
(45) Date of Patent: Mar. 18, 2025

(54) METHOD AND APPARATUS FOR COLLECTING AND MAINTAINING ROAD EVENT DATA

(71) Applicant: HERE Global B.V., Eindhoven (NL)

(72) Inventors: Aparna Rajagopal, Mumbai (IN); Abhishek Singh, Mumbai (IN); Kripa Nair, Maharashtra (IN); Chirag Golechha, Rajasthan (IN); Zhenhua Zhang, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 411 days.

(21) Appl. No.: 17/560,999

(22) Filed: Dec. 23, 2021

(65) Prior Publication Data
US 2023/0206752 A1 Jun. 29, 2023

(51) Int. Cl.
*G08G 1/01* (2006.01)
(52) U.S. Cl.
CPC ......... *G08G 1/0129* (2013.01); *G08G 1/0112* (2013.01); *G08G 1/0133* (2013.01)
(58) Field of Classification Search
CPC ... G08G 1/0133; G08G 1/0112; G08G 1/0129
USPC ....................................................... 707/749
See application file for complete search history.

(56) References Cited

U.S. PATENT DOCUMENTS

| | | | |
|---|---|---|---|
| 9,141,107 B2 | 9/2015 | Ferguson et al. | |
| 9,424,545 B1* | 8/2016 | Lee ................ | G06Q 10/063114 |
| 10,282,999 B2 | 5/2019 | Creusot | |
| 10,584,971 B1 | 3/2020 | Askeland | |
| 10,983,523 B2 | 4/2021 | Sim | |
| 2016/0104377 A1* | 4/2016 | French ................... | G08G 1/092 |
| | | | 701/117 |
| 2018/0176409 A1* | 6/2018 | Smith ................ | H04N 1/00809 |
| 2020/0126419 A1* | 4/2020 | Yasui ..................... | G08G 1/143 |
| 2020/0236501 A1* | 7/2020 | Suzuki ................. | H04W 4/029 |
| 2020/0356722 A1* | 11/2020 | Mano ................. | H04L 12/1822 |
| 2021/0104155 A1* | 4/2021 | Xu ........................ | B60W 50/14 |
| 2021/0231458 A1* | 7/2021 | Millington .......... | G01C 21/3815 |
| 2021/0331699 A1* | 10/2021 | Kim ....................... | G06Q 10/02 |
| 2021/0350310 A1* | 11/2021 | Tashkin ............ | G06Q 10/06398 |
| 2023/0206752 A1* | 6/2023 | Rajagopal ............ | G08G 1/0112 |
| | | | 701/11 |

FOREIGN PATENT DOCUMENTS

| | | |
|---|---|---|
| CN | 107247718 A | 10/2017 |
| JP | 2007085838 A | 4/2007 |

* cited by examiner

*Primary Examiner* — Hosain T Alam
*Assistant Examiner* — Nicholas E Allen
(74) *Attorney, Agent, or Firm* — DITTHAVONG, STEINER & MLOTKOWSKI

(57) ABSTRACT

A method and system are disclosed for collecting and maintaining road event information, where point-based road event location data from transportation authorities, construction companies, vehicle sensors, or combinations thereof, is susceptible to location sensor errors, digital map errors, and/or map mismatching errors. Errors less than a selected threshold are filtered by categorizing or grouping reports of point-based locations into segments along links in a representation of a road, providing improved accuracy of reporting of road events.

20 Claims, 16 Drawing Sheets

Input at time 1: Link 1, Offset 0-0.4, Off Seg: 0-0.2, 0.2-0.4, Start time : 20th End time : 25th Current: 15

421

| Link ID | Offset | Categorized offset | Driving direction | Count | Start Time | End Time | Sent Flag |
|---|---|---|---|---|---|---|---|
| 1 | 0-0.4 | 0-0.2 | To | 1 | 20 | 25 | False |
| 1 | 0-0.4 | 0.2-0.4 | To | 1 | 20 | 25 | False |

425 — 427

Input at time 2: Link 1, Offset 0-0.2, Off Seg: 0-0.2, Start time : 20th End time : 30th Current: 15

429

423

| Link ID | Offset | Categorized offset | Driving direction | Count | Start Time | End Time | Sent Flag |
|---|---|---|---|---|---|---|---|
| 1 | 0-0.4 | 0-0.2 | To | 2 | 20 | 30 | False |
| 1 | 0-0.4 | 0.2-0.4 | To | 1 | 20 | 25 | False |

Input at time1: Link 1, Offset 0-0.4, Off Seg: 0-0.2, 0.2-0.4, Start time : 20th End time : 25th

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 1 | 20 | 25 | False |
| 1 | 0 - 0.4 | 0.2 - 0.4 | To | 1 | 20 | 25 | False |

441

Input at time 2: Offset 0.6-0.65, Off Seg: 0.6-0.8, Start time : 20th, End time : 25th Current: 40

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 1 | 20 | 25 | F |
| 1 | 0 - 0.4 | 0.2 - 0.4 | To | 1 | 20 | 25 | F |
| 1 | 0.6 - 0.65 | 0.6 - 0.8 | To | 1 | 20 | 25 | F |

Events already exist in storage. Current date: 20th

451

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 1 | 20 | 25 | F |
| 1 | 0 - 0.4 | 0.2 - 0.4 | To | 1 | 20 | 25 | F |
| 1 | 0.6 - 0.65 | 0.6 - 0.8 | To | 1 | 20 | 25 | F |

457

New link input: Link 1, Off Seg: 0-0.2, Start time : 20th End time : 30th   Current date: 21st

455

453

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 2 | 20 | 30 | F |
| 1 | 0 - 0.4 | 0.2 - 0.4 | To | 1 | 20 | 25 | F |
| 1 | 0.6 - 0.65 | 0.6 - 0.8 | To | 1 | 20 | 25 | F |

Events already exist in storage. Current Date: 21st

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 1 | 20 | 25 | F |
| 1 | 0 - 0.4 | 0.2 - 0.4 | To | 1 | 20 | 25 | F |
| 1 | 0.6 - 0.65 | 0.6 - 0.8 | To | 1 | 20 | 25 | F |

465

New link input: Link 1, Offset 0.8-1, Off Seg: 0.8-1, Start time: 20th End time : 30th Current: 21st

469

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 1 | 20 | 25 | F |
| 1 | 0 - 0.4 | 0.2 - 0.4 | To | 1 | 20 | 25 | F |
| 1 | 0.6 - 0.65 | 0.6 - 0.8 | To | 1 | 20 | 25 | F |
| 1 | 0.8 - 1 | 0.8 - 1.0 | To | 1 | 20 | 30 | T |

Events already exist in storage. Current Date: 21

| Link ID | Offset | Categorized offset | Driving direction | Count | Start Time | End Time | Sent Flag |
|---|---|---|---|---|---|---|---|
| 1 | 0 - 0.4 | 0-0.2 | To | 1 | 20 | 30 | F |
| 1 | 0 - 0.4 | 0.2 - 0.4 | To | 1 | 20 | 25 | F |
| 1 | 0.6 - 0.65 | 0.6 - 0.8 | To | 1 | 20 | 25 | F |

481

When current date reaches 25th

| Link ID | Offset | Categorized offset | Driving direction | Count | Start Time | End Time | Sent Flag |
|---|---|---|---|---|---|---|---|
| 1 | 0 - 0.4 | 0 - 0.2 | To | 1 | 20 | 30 | F |

483

METHOD AND APPARATUS FOR COLLECTING AND MAINTAINING ROAD EVENT DATA

BACKGROUND

Service providers and device manufacturers (e.g., wireless, cellular, etc.) are continually challenged to deliver value and convenience to consumers by, for example, providing compelling network services and advancing underlying technologies. Various service providers provide updates to consumer map services regarding the presence and status of road events, such as construction zones on roads. Construction detection is a major transportation problem, and up-to-date reporting of construction is very important to map and navigation service providers. Map and navigation service providers need to collect and maintain current construction information not only to alert the drivers about the traffic conditions on roadways but also to evaluate the validity of other traffic entities. In the context of assisted navigation, the accuracy of traffic signs and/or lane marking detection may be less reliable near the construction. Because of inaccuracies in the location of some construction zone data versus ground truth and inconsistencies between providers, location data for construction zones may need additional processing for correction, resulting in delays in the provision of the data and extra costs for the additional processing. Without such correction, updates to construction zone location data may not be recognized as an update to previously identified construction zones. It would be highly beneficial to provide a system that would permit direct utilization of updates to construction zone data that reduces the need for additional processing while providing accurate updates on a timely basis to end-users.

SOME EXAMPLE EMBODIMENTS

Therefore, there is a need for an approach for collecting and maintaining road event information (e.g., construction, a road closure, lane closure, abnormalities in traffic that can affect traffic flow such as accidents, etc.), where road event location data is susceptible to location sensor errors, digital map errors, and/or map mismatching errors.

According to one embodiment, a method comprises receiving road event data, wherein the road event data indicates a road event occurring at an event location specified on a representation of a road by (i) a road event starting point, (ii) a road event ending point, and (iii) one or more full and/or partial links disposed between the road event starting point and the road event ending point. The road event starting point is indicated by a first offset distance value on a first link. The road event ending point is indicated by a second offset distance value on the first link or a second link. The first link and, if applicable, the second link and one or more links disposed between the first link and the second link, are identified as one or more road event links, each having a starting node and an ending node. The method also comprises converting each of the one or more road event links into one or more adjacent categorized offsets starting at the starting node of each road event link. The one or more categorized offsets have a discreet interval, except that a final categorized offset is less than the discreet interval if the ending node is reached prior to the discreet interval. The method further comprises identifying one or more road event categorized offsets from among the one or more categorized offsets within each of the one or more road event links. The one or more road event categorized offsets comprise i) the one or more categorized offsets comprising the road event starting point and/or the road event ending point and ii) if applicable, the one or more categorized offsets disposed between the road event starting point and the road event ending point.

According to another embodiment, an apparatus comprising at least one processor, and at least one memory including computer program code, the at least one memory and the computer program code configured to, with the at least one processor, cause the apparatus to receive road event data, wherein the road event data indicates a road event occurring at an event location specified on a representation of a road by (i) a road event starting point, (ii) a road event ending point, and (iii) one or more full and/or partial links disposed between the road event starting point and the road event ending point. The road event starting point is indicated by a first offset distance value on a first link. The road event ending point is indicated by a second offset distance value on the first link or a second link. The first link and, if applicable, the second link and one or more links disposed between the first link and the second link, are identified as one or more road event links, each having a starting node and an ending node. The apparatus is also caused to convert each of the one or more road event links into one or more adjacent categorized offsets starting at the starting node of each road event link. The one or more categorized offsets have a discreet interval, except that a final categorized offset is less than the discreet interval if the ending node is reached prior to the discreet interval. The apparatus is further caused to identify one or more road event categorized offsets from among the one or more categorized offsets within each of the one or more road event links. The one or more road event categorized offsets comprise i) the one or more categorized offsets comprising the road event starting point and/or the road event ending point and ii) if applicable, the one or more categorized offsets disposed between the road event starting point and the road event ending point.

According to another embodiment, a computer-readable storage medium carrying one or more sequences of one or more instructions which, when executed by one or more processors, cause an apparatus to receive road event data, wherein the road event data indicates a road event occurring at an event location specified on a representation of a road by (i) a road event starting point, (ii) a road event ending point, and (iii) one or more full and/or partial links disposed between the road event starting point and the road event ending point. The road event starting point is indicated by a first offset distance value on a first link. The road event ending point is indicated by a second offset distance value on the first link or a second link. The first link and, if applicable, the second link and one or more links disposed between the first link and the second link, are identified as one or more road event links, each having a starting node and an ending node. The apparatus is also caused to convert each of the one or more road event links into one or more adjacent categorized offsets starting at the starting node of each road event link. The one or more categorized offsets have a discreet interval, except that a final categorized offset is less than the discreet interval if the ending node is reached prior to the discreet interval. The apparatus is further caused to identify one or more road event categorized offsets from among the one or more categorized offsets within each of the one or more road event links. The one or more road event categorized offsets comprise i) the one or more categorized offsets comprising the road event starting point and/or the road event ending point and ii) if applicable, the one or more categorized offsets disposed between the road event starting point and the road event ending point.

According to another embodiment, an apparatus comprises means for receiving road event data, wherein the road event data indicates a road event occurring at an event location specified on a representation of a road by (i) a road event starting point, (ii) a road event ending point, and (iii) one or more full and/or partial links disposed between the road event starting point and the road event ending point. The road event starting point is indicated by a first offset distance value on a first link. The road event ending point is indicated by a second offset distance value on the first link or a second link. The first link and, if applicable, the second link and one or more links disposed between the first link and the second link, are identified as one or more road event links, each having a starting node and an ending node. The apparatus also comprises means for converting each of the one or more road event links into one or more adjacent categorized offsets starting at the starting node of each road event link. The one or more categorized offsets have a discreet interval, except that a final categorized offset is less than the discreet interval if the ending node is reached prior to the discreet interval. The apparatus further comprises means for identifying one or more road event categorized offsets from among the one or more categorized offsets within each of the one or more road event links. The one or more road event categorized offsets comprise i) the one or more categorized offsets comprising the road event starting point and/or the road event ending point and ii) if applicable, the one or more categorized offsets disposed between the road event starting point and the road event ending point.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4F are diagrams of user interfaces utilized in the processes of FIG. 3, according to various embodiments;

DESCRIPTION OF PREFERRED EMBODIMENT

Figure 1A:
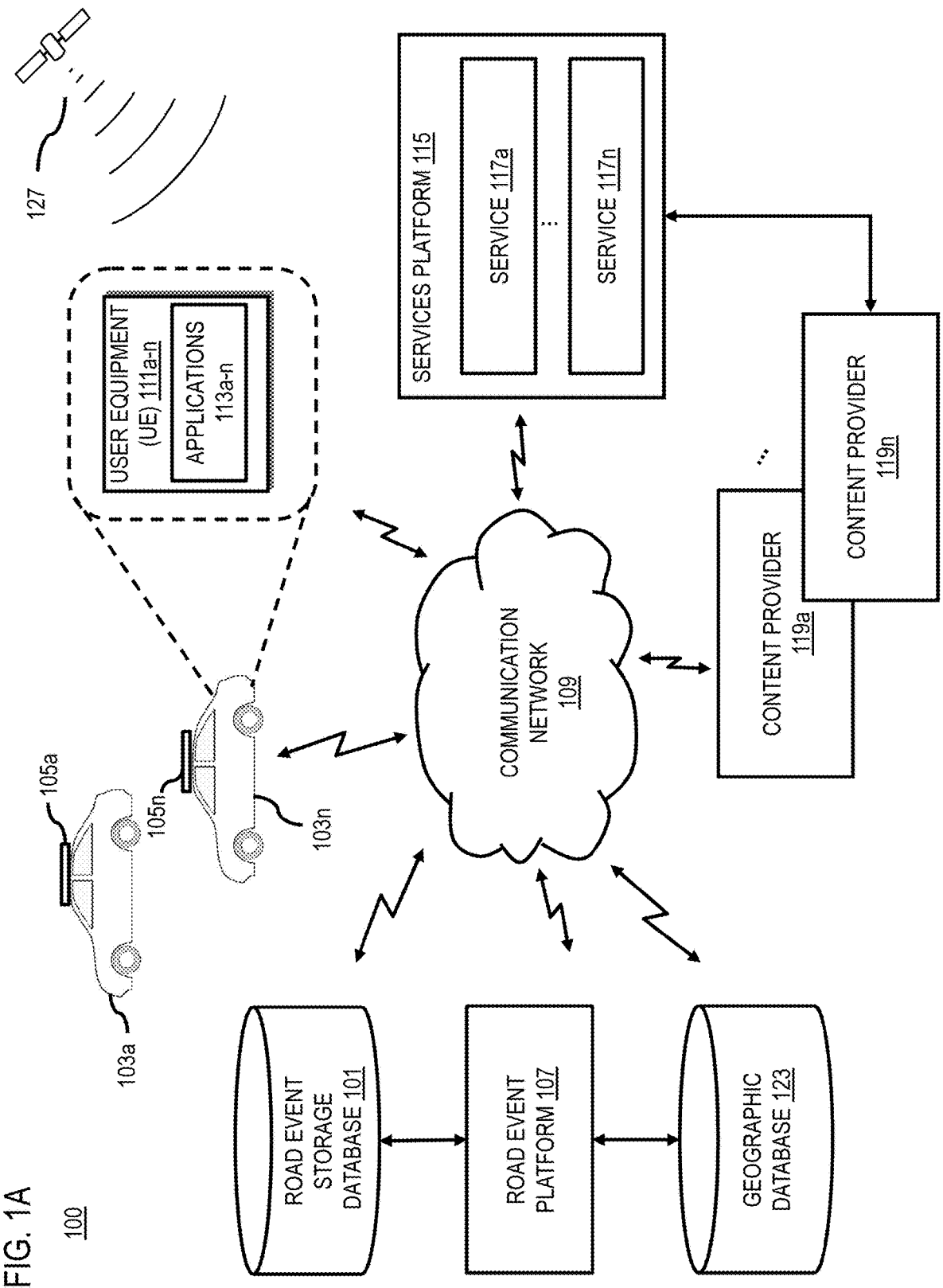
FIG. 1A-1B are diagrams of a system capable of approach for collecting and maintaining road event information, according to one embodiment.

A method and apparatus for collecting and maintaining road event information, where road event location data is susceptible to location sensor errors, digital map errors, and/or map mismatching errors, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "categorized offset" refers to one or more sub-links having a common discrete interval, except where the common discrete interval exceeds the length of the relevant road event link or the relevant road event link is not evenly divisible by the common discreet interval. In these instances, a categorized offset will have a length equal to the remainder of the relevant link after the link has been divided into the maximum number of categorized offsets of the discreet common interval. In some embodiments, categorized offsets are associated with a link location and a travel direction.

As used herein, the term "downstream," when comparing locations (points, links, nodes, road event, road event links, or categorized offsets) on a representation of a road, means that a second location is downstream of a first location if the second location is farther away from a chosen origin or starting point on the representation of the road.

As used herein, the term "ending node" refers to the node at the downstream end of a link. mismatching As used herein, the term "link" refers to a line segment representing a portion of a road. The endpoints of the line segment are defined by nodes. Each link spans between a starting node at the upstream end of the link and an ending node at the downstream end of the link.

As used herein, the term "node" refers to a point spatial object that is used to represent connectivity between two road links and correspondingly represent the endpoints of a link.

As used herein, the term "offset" refers to a distance measured along a link measured from the starting node.

As used herein, the term "record" refers to data associated with a road event categorized offset. Such data can include, but is not limited to a unique label identifier, link location of the categorized offset, travel direction, starting date of the road event, ending date of the road event, count of data feeds associated with the categorized offset, and other recorded attributes of the road event.

As used herein, the term "representation of a road" refers to a series of adjacent links connected at nodes. The ending node of a link is also the starting node of the next link downstream in the series.

As used herein, the term "road event" refers to a portion a road subject to abnormalities in traffic that can affect traffic flow, such as, but not limited to, construction work, a road closure, lane closure, accidents, demolition work, painting of road markings, erection of road signs, or damage to or obstructions in the road resulting from a vehicular accident. The road event starting point is identified on a representation of a road by a first offset distance on a first link. The road event ending point is identified on the representation of the road by a second offset distance on the same link in the downstream direction from the road event starting point or by a second offset distance on a second link in the downstream direction form the first link. The representation of the road event includes all full or partial links disposed between the road event starting point and the road event ending point.

As used herein, the term "road event categorized offset" refers to a sub-link comprising all or a portion of a road event. A categorized offset can comprise the starting point and/or the ending point of a road event. A road event categorized offset is also any categorized offset disposed between a categorized offset comprising the starting point of a road event and a categorized offset comprising the ending point of a road event.

As used herein, the term "road event link" refers to a link comprising all or a portion of a road event. A road event link can comprise the starting point of a road event such that the downstream portion of the link or the portion of the link between the starting point of the road event and the ending node of the link represents all or a portion of the road event. A road event link can comprise the ending point of a road event such that the upstream portion of the link or the portion of the link between the starting node of the link and the ending point of the road event all or a portion of the road event. A road event link can be a link disposed between a link comprising the road event starting point and a link comprising the road event ending point such that the entire link represents a portion of the road event.

As used herein, the term "starting node" refers to the node at the upstream end of a link with respect to a direction of travel along a road.

As used herein, the term "sub-link" refers to a portion of a link, wherein a link is divided into a sequence of adjacent sub-links.

FIG. 1A is a diagram of a system capable of capable of collecting and maintaining road event information (e.g., construction), where road event location data is susceptible to location sensor errors, digital map errors, and/or map mismatching errors, according to one embodiment. In addition to these issues, the location of the construction may not be static. The start/end location of the construction often move over time. Desirably, a map or navigation service provider could verify and reflect these changes in real-time or near real-time with a high level of confidence, such changes including, but not limited to: 1) detection and reporting of new construction; 2) maintenance and reporting of planned schedules and locations for identified construction; and 3) detecting and reporting completion of construction, including removal of completed construction sites from the relevant service.

Current map and navigation services typically provide only point-based location alerts. Due to the possible errors in point-based reports received from multiple sources, failure to match reports of road events to actual locations on a road can result in failure to provide real-time alerts to end-users. This can mean that an end-user fails to receive notification of the start of construction work at a road location, the status of ongoing construction at a road location, or the fact that construction has been completed at a road location and traffic has resumed normal flow. New construction events would be added to the database of the map or navigation service provider. Existing construction records in the database of the map or navigation service provider would be updated based on current reports of construction status, schedule and plans. Existing construction records in the database of the map or navigation service provider would be deleted based on current reports of completed construction. Current reports on existing construction events would be added to the database of the map or navigation service provider. wherein the construction event would be added to the Although much discussion herein is directed to construction work, as a common interruption to normal traffic flow, it should be recognized that the principles herein apply to any interruption of normal traffic flow, including, but not limited to, a road closure, lane closure, accidents, demolition work, painting of road markings, erection of road signs, or damage to or obstructions in the road resulting from a vehicular accident.

The system and process described herein provides for improved alerts—higher level of accuracy, more timely and closer to real-time, or a combination thereof—to the location of road construction, particularly the starting location and ending location, by categorizing or grouping reports of point-based locations into segments, sub-links, or categorized offsets along links in a representation of a road. Such categorization or grouping essentially filters errors less than a selected threshold or within a selected precision by treating reports of location points falling between the endpoints of segments, sub-links, or categorized offsets along links in a representation of a road as equivalent. Use of categorized offsets to reflect the effective location of construction on a link and node representation of a road allows for more effective combining of multi-sourced data feeds, such as, but not limited to, construction information from one or more transportation authorities, one or more construction companies, one or more vehicle sensors, or combinations thereof.

The system and process described herein provides a road event database for collection and maintenance of road event data, both unprocessed and processed and described herein. Such database may be a cloud-based service, a local service, a native application, or combination thereof or any other suitable combination of hardware and/or software suitable for performing the functions described herein.

When new point-based road event data is received, it is converted to provide a representation of the location of the road event based on categorized offsets. The categorized offsets have a discrete interval based on a selected precision, the availability of data, or a combination thereof. The interval of the categorized offset should be greater than or equal to two times the desired precision measurement. For example, a categorized offset interval of at least 40 meters would be selected for a desired precision of 20 meters, such that the minimum categorized offset is based on the midpoint of the interval plus or minus the distance of the desired precision. With respect to the availability of data, a greater amount of data points permits a high degree of granularity and a smaller interval for the categorized offsets.

In some embodiments, during a finite timeframe and for a limited portion of or number of links along a roadway, the conversion of links to categorized offsets will use the same intervals between older road data and newer road data in order to perform comparisons of road event data associated with each categorized offset as required by later steps of the process disclosed herein.

In some embodiments, existing records in the road event storage database are reviewed for activation or deactivation. In some embodiments, one or more fields in the record associated with each categorized offset stored on the road event storage database is compared to one or more activation conditions associated with each of the one or more fields. If the value in any field meets an activation condition associated with that field, the categorized offset associated with the field is activated. For example, if the activation condition was whether the current date is equal to or greater than the construction starting date associated with a categorized offset and the current date is after the construction starting date, the record for that categorized offset is added to the active portion of the road event storage database. The location associated with that categorized offset will be reported to the end-user as having active construction in progress.

In some embodiments, one or more fields in the record associated with each categorized offset stored on the road event storage database is compared to one or more deactivation conditions associated with each of the one or more fields. If the value in any field meets a deactivation condition associated with that field, the categorized offset associated with that field is deactivated. For example, if the deactivation condition was whether the current date is equal to or greater than the construction ending date associated with a categorized offset and the current date is after the construction ending date, the record for that categorized offset is deleted from the active portion of the road event storage database. The location associated with that categorized offset will be reported to the end-user as open and not having active construction in progress.

In some embodiments, the road event storage database comprises an active storage layer and an inactive storage layer. The inactive storage layer can retain all or a portion of unprocessed road event data and processed (according to the processes described herein) road event, such as, but not limited to road links, categorized offsets, road event categorized offsets, and any recorded attributes of the associated road events. The active storage layer contains all or a portion of the road event data stored in the inactive storage layer provided that such road event data is processed data (according to the processes described herein) road event, such as, but not limited to road links, categorized offsets, road event categorized offsets, and any recorded attributes of the associated road events, wherein such processed road event data satisfies an activation condition and does not subsequently satisfy a deactivation condition.

For example, in one instance, a record comprising a link location of a road event categorized offset, a starting date July 1, and an ending date of July 15, has been produced from data related to a road event received by system 100. On June 15, the record resides in the inactive storage layer, where it remains until July 1. On July 1, the activation condition of starting date is satisfied. At that time the record remains in the inactive storage layer but also is populated in the active storage layer. The record remains in both the active and inactive storage layers until July 15. On July 15, the deactivation condition of ending date is satisfied. On July 15, the record is removed from the active storage layer and resides only in the inactive storage layer, where it remains.

The road event database is reviewed on a fixed interval or intermittently or may be prompted manually for a review of records for activation and/or deactivation conditions, triggering addition and/or deletion of records from the active storage layer. Review of the road event database for activation and/or deactivation conditions can be performed automatically on a by software included in system 100 or can be triggered by an end-user or an operator of system 100.

The road event data that resides in the active storage layer of the road event storage database is "reportable" in that road event status data is deliverable to end-users automatically, manually, or on-demand. Reportable road event data can be delivered to applications and/or user equipment of end-users.

A road event storage database is initially populated with a first set of categorized road event data. In some embodiments, a set of road event data will comprise a starting time and an ending time for construction associated with each categorized offset in a categorized road event data set. When new road event data is received, it is converted into a second set of categorized road event data. In each road event data set, a road event is represented by one or more adjacent categorized offsets. In some embodiments, each categorized offset in a set of road event data is further associated with a label, or link identification ("link ID"), and a direction of travel, or driving direction.

In some embodiments, new records are added to the road event storage database, or existing records in the road event storage database are updated based on location of a categorized offset. In some embodiments, each categorized offset in a set of road event data is further associated with construction starting dates and ending dates, in addition to a link ID and a driving direction. Each categorized offset in the second set of road event data is compared to each categorized offset in the first set of categorized road event data stored on the road event storage database. When a categorized offset from the second set of road event data is determined to match a categorized offset in the first set of categorized road event data stored on the road event storage database, the construction starting dates and ending dates associated with the categorized offset stored on the road event storage database will be replace with the construction starting dates and ending dates from the matching categorized offset in the second road event data set. When a categorized offset from the second set of road event data is determined to not match any categorized offset in the first set of categorized road event data stored on the road event storage database, the categorized offset from the second set of road event data is added to the road event storage database, along with the associated construction starting dates and ending dates, as a new record.

As shown in FIG. 1A, the system 100 comprises user equipment ("UE") 111a-n (e.g., a mobile device, an embedded navigation system, a client terminal, etc.) having connectivity to the road event storage database 101, road event platform 107, geographic database 123, sensors 105a-n, content providers 119a-n, and services 117a-n via services platform 115 via the communication network 109. By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), 5G New Radio networks, Long Term Evolution (LTE) networks, code division multiple access (CDMA), wireless fidelity (WiFi), satellite, mobile ad-hoc network (MANET), and the like.

Each of the UE 111a-n is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 111a-n can support any type of interface to the user (such as "wearable" circuitry, etc.).

A method, implemented on one or more processors, is disclosed herein. The method is useful for collecting and maintaining road event information, where road event location data is susceptible to location sensor errors, digital map errors, and/or map mismatching errors. The method comprises receiving road event data, wherein the road event data indicates a road event occurring at an event location specified on a representation of a road by (i) a road event starting point, (ii) a road event ending point, and (iii) one or more full and/or partial links disposed between the road event starting point and the road event ending point, wherein: the road event starting point is indicated by a first offset distance value on a first link; the road event ending point is indicated by a second offset distance value on the first link or a second link; and the first link and, if applicable, the second link and one or more links disposed between the first link and the second link, are identified as one or more road event links, each having a starting node and an ending node.

In some embodiments, the method further comprises converting each of the one or more road event links into one or more adjacent categorized offsets starting at the starting node of each road event link. The one or more categorized offsets have a discreet interval, except that a final categorized offset is less than the discreet interval if the ending node is reached prior to the discreet interval. In some instances, the road event data comprises a construction start date, a construction end date, and a number of data feeds. In some instances, the one or more records are added to a road event storage database.

In addition to the above, some embodiments further comprise identifying one or more road event categorized offsets from among the one or more categorized offsets within each of the one or more road event links. The one or more road event categorized offsets comprise: the one or more categorized offsets comprising the road event starting point and/or the road event ending point; and the one or more categorized offsets disposed between the road event starting point and the road event ending point. In some instances, categorized offsets each have a discrete interval, determined based on a desired precision of the road event data, number of road event observations, or a combination thereof.

In addition to the above, some embodiments further comprise providing categorized road event data as an output. The categorized road event data comprises one or more records corresponding to each of the one or more categorized offsets. Each of the one or more records comprises a sub-link location of the each of the one or more categorized offsets corresponding to the each of the one or more records. In some instances, each of the one or more records further comprises the construction start date, the construction end date, and the number of data feeds.

In further embodiments, second road event data are processed in the same manner as the earlier road event data. Second categorized road event data is provided as an output. The second categorized road event data comprises one or more second records corresponding to each of the one or more second categorized offsets. Each of the one or more second records comprises a second sub-link location of the each of the one or more second categorized offsets corresponding to the each of the one or more records, a second construction start date, the second construction end date, and the second number of data feeds. In further possible steps, a record is replaced with a second record if a second sub-link location associated with a second record matches a sub-link location associated with a record. Alternatively, a second record is added to the road event storage database records if the second sub-link location associated with a second record does not match a sub-link location associated with a record.

In other aspects of the method, records in the road event storage database are routinely compared to one or more activation conditions and/or deactivation conditions. If an activation condition is satisfied by a record, the record is added to a construction status report. If a deactivation condition is satisfied by a record, the record is deleted from the road event storage database.

In one embodiment, a method is implemented on one or more processors. The method comprises: receiving road event data comprising a road event location, wherein the road event location is represented by a first link location, a second link location, and one or more links and/or partial links disposed between the first link location and the second link location; converting the road event location to a categorized road event location, wherein the categorized road event location comprises one or more adjacent categorized offsets corresponding to the road event location; and providing categorized road event data as an output. The categorized road event data comprises one or more records corresponding to each of the one or more adjacent categorized offsets. Each of the one or more records comprises a sub-link location of the each of the one or more adjacent categorized offsets corresponding to the each of the one or more records. The categorized road event data is added to the inactive storage layer of the road event storage database. When additional road event information is received by system 100, it is processed as described above to produce categorized second road event data as an output. Categorized second road event data is compared to categorized road event data stored in the inactive storage layer. When a stored record and a second record have the same link location, the stored record is updated to match the second record. If the second record has a new link location, the second record is added to the inactive storage layer. The categorized road event data in the inactive storage layer is reviewed on a repetitive basis for activation and/or deactivation conditions. Satisfaction of an activation condition results in duplicating a record in the active storage layer. Subsequent satisfaction of a deactivation condition results in deletion of a record from the active storage layer.

An apparatus for implementing the foregoing processes is disclosed herein. The apparatus comprises at least one processor and at least one memory. The at least one memory includes a computer program code for one or more programs. The at least one memory and the computer program code and the at least one processor are configured to cause the apparatus to perform all steps of the method described above.

A non-transitory computer readable storage medium is disclosed herein. One or more program instructions are stored on the computer readable storage. The program instructions are executed by one or more processors to cause the apparatus to perform all steps of the methods described above.

By way of example, UE 111a-n having connectivity to the road event storage database 101, road event platform 107, geographic database 123, sensors 105a-n, content providers 119a-n, applications 113a-n, and services 117a-n via services platform 115 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In some embodiments, system is provided with UE 111a-n wherein applications 113a-n installed on UE 111a-n are operable to produce a user interface to communicate road event information to one or more end-users, wherein such road event information is received over communication network 109. Such applications 113a-n may also be installed on computing system on board vehicles 103a-n for delivery of road event information to end-users via a user interface in a vehicle.

Conversely, probe sensors 105a-n on board vehicles 103a-n along with data automatically collected and/or observations manually input into applications 113a-n installed on UE 111a-n can be collected by system 100 for processing by road event platform 107 and/or storage on road event storage database 101.

Figure 1B:
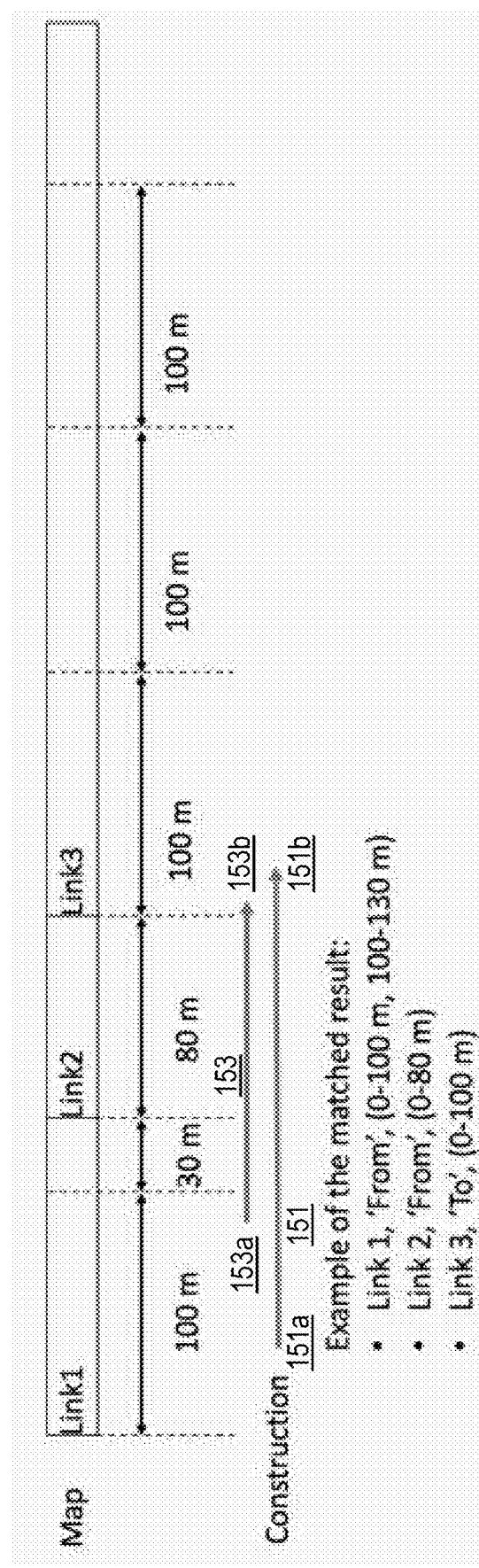

FIG. 1B provides a graphical representation of an implementation of categorized offsets. Link 1 is 130 meters in length. Adjacent to Link 1, Link 2 is 80 meters in length. Adjacent to Link 2, Link 3 is 300 meters in length. The selected or pre-defined length of categorized offsets in this example is 100 meters. Therefore, Link 1 is converted into two adjacent categorized offsets, wherein the first categorized offset is 100 meters in length, and the second categorized offset is 30 meters in length. Link 2 is 80 meters in length and therefore is converted to a single categorized offset of 80 meters in length. Link 3 is 300 meters in length and therefore converted into three adjacent categorized offsets, each 100 meters in length. Two reports of the same construction event are shown as a first road event location 151, extending from starting point 151a to ending point 151b, and a second road event 153, extending from starting point 153a to ending point 153b. Starting point 151a is approximately 50 meters upstream of starting point 153a, and, ending point 151b is approximately 10 meters downstream ending point 153b. Due to the mismatch of starting points 151a, 153a and ending points 151b, 153b and an overall different in length of the first road event location report 151 and the second road event location report 153 of approximately 60 meters, the two reports may not be matched as updates for the same road event. Receipt of the road event location reports from different sources, such as one or more transportation authorities and/or one or more construction companies, where each report might be subject to sensor errors, digital map errors, and/or map mismatching errors could produce such results.

In FIG. 1B, Link1, Link2, and Link3 are considered road event location links for the first and second road event location reports according to the method disclosed herein, since at least a portion of road event location 151 and road event 153 is present in all three links. Therefore, all three road event links are converted into categorized offsets as described above. Due the location of starting points 151*a*, 153*a* and ending points 151*b*, 153*b*, both categorized offsets in Link1, the single categorized offset of Link2, and the first categorized offset in Link 3 would be considered road event categorized offsets, according to the method disclosed herein. As shown in FIG. 1B, the categorized road event data delivered as output of the method is: Link1, 'From', (0-100 m, 100-130 m); Link2, 'From', (0-80 m); Link3, 'To', (0-100 m).

As shown in FIG. 1B, categorized offsets provide for standardized treatment of road event data. In some embodiments, road links are converted into categorized offsets prior to the receipt of any road event data. In some embodiments, road links associated with road events are converted to categorized offsets upon the receipt of first road event data or alternatively reference categorized offsets created prior to the receipt of any road event data. When a second set of road event data is received, in different embodiments, system 100 may reference categorized offsets created before the receipt of any road event data or categorized offsets created after receipt of the first road event data, or system 100 may convert road links to categorized offsets after receipt of second road event data, wherein such categorized offsets will correspond to categorized offsets previously created for the same road link or links. Within a selected timeframe and within a selected geographic area, categorized offsets remain constant to permit standardized treatment of road event attributes associated with each such categorized offset over time.

For example, in one instance, conversion categorized offsets occurs upon receipt of construction event data as indicated by location 151, and categorized offsets were created as shown in FIG. 1: Link 1 (0-100 m); Link 1 (100-130 m); Link 2 (0-80 m); Link 3 (0-100 m), etc. Upon the receipt of second construction event data indicated by location 153, the same corresponding categorized offsets may be recreated or system 100 may reference the categorized offsets previously created for location 151. Further, when more new road event data is obtained, for instance from vehicle sensor data from a first vehicle, it may indicate construction in certain locations that are then assessed against the set of categorized offsets and matched to: Link 1 (0-100 m); Link 1 (100-130 m); Link 2 (0-80 m); Link 3 (0-100 m). Then, when yet another instance of new road event data is obtained, for instance from vehicle sensor data from a second vehicle, it may indicate construction has progressed in certain locations since the first vehicle's data. In this case, however, new data might match only to: Link 1 (100-130 m) and Link 2 (0-80 m); Link 3 (0-100 m), thus indicating that construction is no longer detected at Link 1 (0-100 m). Therefore, the standardization of categorized offsets road event reports that are both more timely and more accurate. Returning to FIG. 1A, in one embodiment, the road event platform 107 performs the process for receiving road event information one or more transportation authorities, one or more construction companies, and/or one or more vehicle sensors 105*a-n*. The road event platform 107 has connectivity over the communications network 109 to the services platform 115 (e.g., an OEM platform) that provides the services 117*a*-117*n* (also collectively referred to herein as services 117) (e.g., probe and/or sensor data collection services). By way of example, the services 117 may also be other third-party services and include mapping services, navigation services, road event services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g., whether a road segment is closed or not) of the road event platform 107 to provide services such as navigation, mapping, other location-based services, etc.

In one embodiment, the road event platform 107 may be a platform with multiple interconnected components. The road event platform 107 may include multiple servers, intelligent networking devices, computing devices, components, and corresponding software for providing parametric representations of lane lines. In addition, it is noted that the road event platform 107 may be a separate entity of the system 100, a part of the services platform 115, a part of the one or more services 117, or included within one or more vehicles 103*a-n* (e.g., an embedded navigation system).

In one embodiment, content providers 119 may provide content or data (e.g., including road construction events, road closure reports, probe data, expected vehicle volume data, etc.) to the road event platform 107, the UE 111*a-n*, the applications 113*a-n*, the services platform 115, the services 117, the geographic database 123, and the vehicles 103*a-n*. The content provided may be any type of content, such as map content, textual content, audio content, video content, image content, etc. In one embodiment, the content providers 119 may provide content regarding the expected frequency of vehicles 103*a-n* on the digital map or link as well as content that may aid in localizing a vehicle path or trajectory on a digital map or link (e.g., to assist with determining actual vehicle volumes on a road network). In one embodiment, the content providers 119 may also store content associated with the road event platform 107, the services platform 115, the services 117, the geographic database 123, and/or the vehicles 103*a-n*. In another embodiment, the content providers 119 may manage access to a central repository of data, and offer a consistent, standard interface to data, such as a repository of probe data and/or the geographic database 123.

By way of example, the UE 111*a-n* are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111*a-n* can support any type of interface to the user (such as "wearable" circuitry, etc.). In one embodiment, one or more UE 111*a-n* may be associated with one or more vehicles 103*a-n* (e.g., a mobile device) or be a component part of one or more vehicles 103*a-n* (e.g., an embedded navigation system). In one embodiment, the UE 111*a-n* may include the road event platform 107 to detect a road event on one of nearby paths.

In one embodiment, as mentioned above, the vehicles 103*a-n*, for instance, are part of a probe-based system for collecting probe data for detecting actual and expected vehicle volumes on a road network and/or measuring traffic conditions in a road network (e.g., free flow traffic versus a road closure). In one embodiment, each of vehicles 103*a-n* is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103a-n may include vehicle sensors 105a-n for reporting measuring and/or reporting attributes. The attributes can also be any attribute normally collected by an on-board diagnostic (OBD) system of the vehicles 103a-n, and available through an interface to the OBD system (e.g., OBD II interface or other similar interface).

The probe points can be reported from the vehicles 103a-n in real-time, in batches, continuously, or at any other frequency requested by the system 100 over, for instance, the communication network 109 for processing by the road event platform 107. The probe points also can be map matched to specific road links stored in the geographic database 123. In one embodiment, the system 100 (e.g., via the road event platform 107) generates vehicle paths or trajectories from the observed and expected frequency of probe points for an individual probe as discussed with respect to the various embodiments described herein so that the probe traces represent a travel trajectory or vehicle path of the probe through the road network.

In one embodiment, as previously stated, the vehicles 103a-n are configured with various sensors (e.g., vehicle sensors 105a-n) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the geographic database 123) includes data from location probes collected by one or more vehicle sensors 105a-n. By way of example, the vehicle sensors 105a-n may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103a-n, switch sensors for determining whether one or more vehicle switches are engaged, and the like. Though depicted as automobiles, it is contemplated the vehicles 103a-n can be any type of vehicle manned or unmanned (e.g., cars, trucks, buses, vans, motorcycles, scooters, drones, etc.) that travels through road segments of a road network.

Other examples of sensors 105a-n of vehicles 103a-n may include light sensors, orientation sensors augmented with height sensors and acceleration sensor (e.g., an accelerometer can measure acceleration and can be used to determine orientation of the vehicle), tilt sensors to detect the degree of incline or decline of vehicles 103a-n along a path of travel, moisture sensors, pressure sensors, etc. In a further example embodiment, vehicle sensors 105a-n about the perimeter of a vehicles 103a-n may detect the relative distance of the vehicles 103a-n from a physical divider, a lane line of a link or roadway, the presence of other vehicles, pedestrians, traffic lights, potholes and any other objects, or a combination thereof. In one scenario, the vehicle sensors 105a-n may detect weather data, traffic information, or a combination thereof. In one embodiment, vehicles 103a-n may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UE 111a-n may also be configured with various sensors (not shown for illustrative convenience) for acquiring and/or generating probe data and/or sensor data associated with a vehicles 103a-n, a driver, a passenger, other vehicles, conditions regarding the driving environment or roadway, etc. For example, such sensors may be used as GPS receivers for interacting with the one or more satellites 127 to determine and track the current speed, position, and location of vehicles 103a-n travelling along a link or road segment. In addition to road event data, the sensors may gather tilt data (e.g., a degree of incline or decline of the vehicle during travel), motion data, light data, sound data, image data, weather data, temporal data and other data associated with the vehicles 103a-n and/or UE 111a-n. Still further, the sensors may detect local or transient network and/or wireless signals, such as those transmitted by nearby devices during navigation of a vehicle along a roadway (Li-Fi, near field communication (NFC)) etc.

It is noted therefore that the above-described data may be transmitted via the communication network 109 as probe data (e.g., GPS probe data) according to any known wireless communication protocols. For example, each UE 111a-n, applications 113a-n, user, and/or vehicles 103a-n may be assigned a unique probe identifier (probe ID) for use in reporting or transmitting the probe data collected by the vehicles 103a-n and/or UE 111a-n. In one embodiment, each of vehicles 103a-n and/or UE 111a-n is configured to report probe data as probe points, which are individual data records collected at a point in time that records telemetry data.

In one embodiment, the road event platform 107 retrieves aggregated probe points gathered and/or generated by the vehicle sensors 105a-n and/or the UEs 111a-n resulting from the travel of the UE 111a-n and/or vehicles 103a-n on a road segment of a road network. In one instance, the geographic database 123 stores a plurality of probe points and/or trajectories generated by different vehicle sensors 105a-n, UE 111a-n, applications 113a-n, vehicles 103a-n, etc. over a period while traveling in a large, monitored area (e.g., a stretch of roadway where a closure incident is reported). A time sequence of probe points specifies a trajectory—i.e., a path traversed by a UE 111a-n, applications 113a-n, vehicles 103a-n, etc. over the period. In one instance, as the time between data points increases, so does the distance and the possible routes/paths between those two points.

In some embodiments, the method comprises receiving road event data using the road event platform 107. Road event data indicates a road event occurring at an event location specified on a representation of a road. A road event location is identified by a starting point and ending point on a link representation of a road. The starting point is represented as a point on a link a distance from the starting node. The road event ending point is downstream of the starting point and is represented as a point on the same or a different link, such that the event may be represented as a portion of a link, a portion of each of two consecutive links, or a downstream portion of a first link, one or more intermediate links, and the upstream portion of a last link. A link comprising all or a portion of a road event is designated as a road event link herein.

Road event links are converted to categorized offsets by the road event platform 107. Categorized offsets are sub-links having a discrete interval. In some embodiments, the discrete interval is configurable by referencing a desired or required precision, wherein the interval of the categorized offset is at least twice the distance of the desired or required precision. The interval of the categorized offset may also reference the amount of available data, wherein a higher amount of data permits a smaller interval for a categorized offset. In some embodiments, a road event link is converted to categorized offsets by starting at the starting node of the road event link and adding adjacent categorized offsets until the ending node of the road event link is reached. If the categorized offset is longer than the length of the road event link, then that road event link contains one categorized offset having the length of the original road event link. If the length of the road event link is not evenly divisible by the length of the categorized offset, then the remaining length of the road event link after the last full categorized offset at the downstream end of the road event link is the length of the last categorized offset for that road event link. This division of a road event link could also be started at the ending node at the downstream end of the road event link on on a different basis, provided that the subdivision of a representation of the same road link must be the same from data set to data set to permit comparison of road event data as described herein.

Road event categorized offsets are selected from among the categorized offsets associated with the road event links. Road event categorized offsets are categorized offsets that contain the starting point and/or the ending point of the road event, and any categorized offsets disposed between the starting point and/or the ending point of the road event. In addition to a location defined by a starting point and an ending point, road event data can also include other attributes associated with the road event. such as, but not limited to, a construction start date, a construction end date, and a number of data feeds. Such additional road event attributes are added to each of the adjacent categorized offset using road event platform 107. This categorized road event data is sent by road event platform 107 to the road event storage database 101.

In further embodiments, second road event data are processed by road event platform 107 in the same manner as the earlier road event data. Second categorized road event data is provided as an output road event platform 107, and records are created for each categorized offset and any other road event attribute data included with the second road event data. The records from the first and second road event data could be represented as R1 and R2, respectively:

R1=(link_ID_1, TD_1, link_loc_1, construction start date_1, construction end date_1)
R2=(link_ID_2, TD_2, link_loc_2, construction start date_2, construction end date_2)
wherein: link_ID is a unique label for a categorized offset;
TD is a travel direction (e.g., "to" or "from", "upstream" or "downstream"); construction start date is the construction start date associated with the road event; and construction end date is the construction end date associated with the road event.

Road event platform 107 produces R2 from road event data that is later in time than R1 and retrieves R1 from the road event storage database 101. If link_loc_2 matches link_loc_1, then all attributes of R1 are updated to match R2 and R1 is returned to the road event storage database 101 by road event platform 107. If link_loc_2 does not match link_loc_1, then R2 is added to the road event storage database 101 by road event platform 107. In some embodiments, the matching is performed for all categorized offsets in the representation of each road event. That is to say, that all categorized offset locations must match for all categorized offsets associated with two sets of road event date in order for the categorized offset data sets to match.

In another aspect, road event platform 107 reviews all records in the road event storage database 101, either automatically on a preset time interval and/or when prompted by an end-user or an operator of system 100 to determine if one or more records satisfy one or more activation conditions and/or one or more deactivation conditions.

Figure 2:
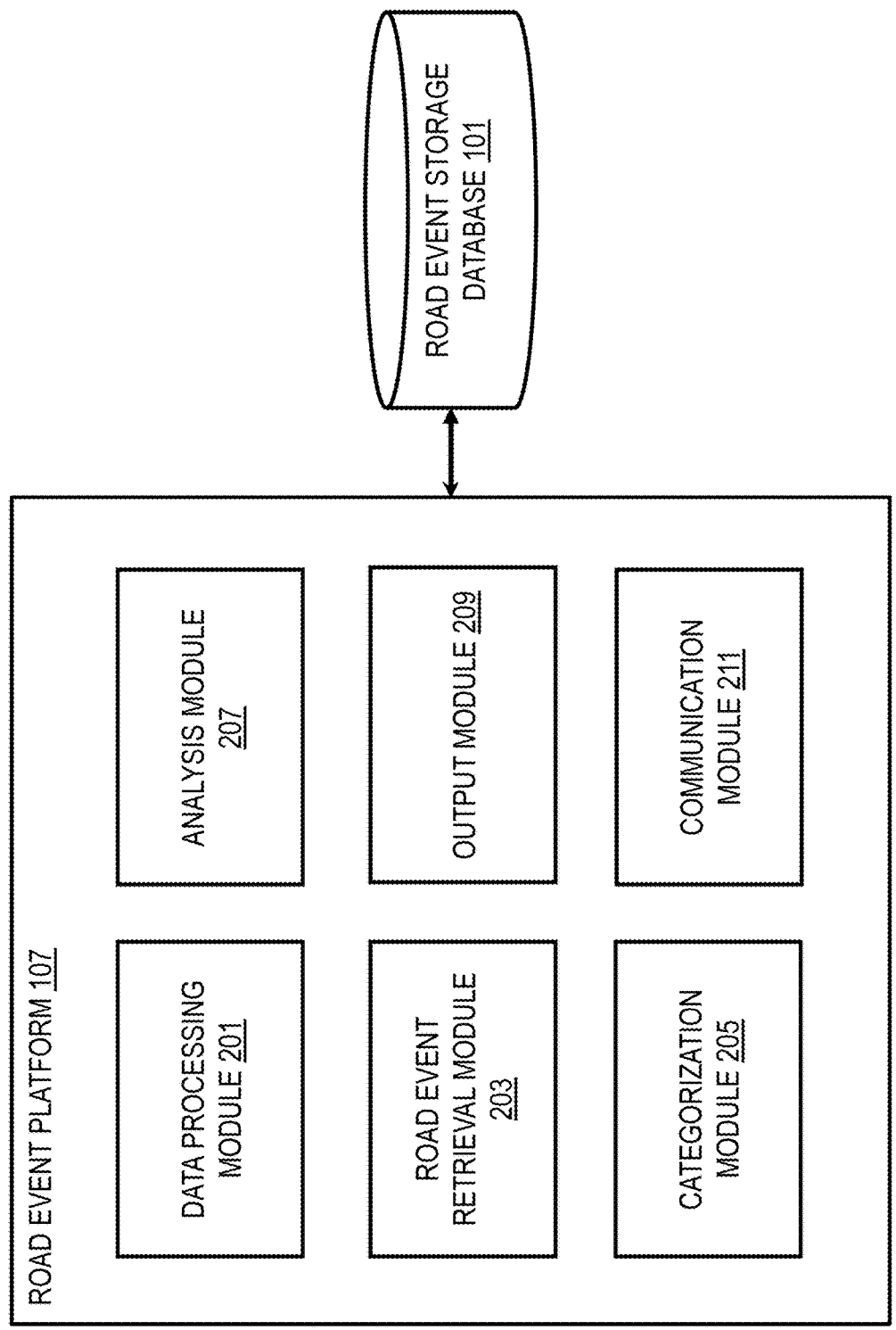
FIG. 2 is a diagram of the components of road event platform and road event storage database, according to one embodiment.

FIG. 2 is a diagram of the components of road event platform 107 and road event storage database 101, according to one embodiment. By way of example, the road event platform 107 includes one or more components for providing an approach for collecting and maintaining road event information, where road event location data is susceptible to location sensor errors, digital map errors, and/or map mis-matching errors. The method and apparatus receive data associated with a road event, such as, but not limited to, construction using data, from multiple sources, including from one or more transportation authorities, one or more construction companies, and/or one or more vehicle sensors. The data is processed using data processing module 201 and analysis module processing module 201. Further processing in categorization module 205 convert the road event data from a link and node representation to a categorized offset representation. Output module 209 prepares and formats processed and unprocessed road event data and communication module 211 sends such data to road event storage database. 101.

When new road event data is processed, communication module 209 retrieves older road event records from road event storage database 101 for comparison to newly processed incoming road event data. Comparison of new road event records to existing road event records is facilitated by conversion of traditional link location representation of a road events by categorization module 205 into representation of a road event location as a series of adjacent categorized offsets, wherein each categorized offset is represented in some instances by (link identifier, travel direction, link location). Link identifier is a unique label for each categorized offset. Travel direction is an indicator traffic travel on the section of road represented by the categorized offset ("to" or "from"; "upstream" or "downstream", etc.) to orient as the lane of travel of the end-user or the parallel lane for oncoming traffic. Link location is the interval of the categorized offset identified on a conventional link representation of a roadway. In some embodiments, matching of road events is determined as two events represented by the same series of adjacent categorized offsets, even though the two events may not have been recognized as being associated with the same road event by traditional location identification as by starting points and ending points on links due to errors in such point location identifiers. Analysis module 207 identifies and compares new categorized offsets to existing categorized offsets by matching link locations of the categorized offsets. When the link locations of newer and older records match, the newer record replaces the older record or the older record is updated to contain the newer road event data information. In either case, communication module 211 is used to send the updated record to road event storage database 101. If no existing record is found having categorized offset link location matching a new record, communication module 211 is used to send the new record to be added to road event storage database 101.

Analysis module 207 is used to initiate reviews of road event storage database 101 automatically at some selected frequency or through prompting by an end-user or a system operator. These reviews are to check for activation or inactivation conditions for road event records stored in road event storage database 101. If an activation condition is satisfied, road event data associated with the record will be reported to the end-user as current, and the record is retained on road event storage database 101. If a deactivation condition is satisfied, road event data associated with the record will be deleted from the road event storage database and reporting to the end-user will reflect no road event at the relevant location.

It is contemplated that the functions of these components may be combined in one or more components or performed by other components of equivalent functionality. In this embodiment, the road event platform 107 includes a data processing module 201, road event retrieval module 203, categorization module 205, analysis module 207, output module 209, and communication module 211, and has connectivity to road event storage database 101. The above presented modules and components of the road event platform 107 can be implemented in hardware, firmware, software, or a combination thereof. Though depicted as a separate entity in FIG. 1A, it is contemplated that the road event platform 107 may be implemented as a module of any other component of the system 100. In another embodiment, the road event platform 107 and/or the modules 201-211 and road event storage database 101 may be implemented as a cloud-based service, local service, native application, or combination thereof. The functions of the road event platform 107 and/or the modules 201-211 and road event storage database 101 are discussed with respect to FIG. 3.

Figure 3A:
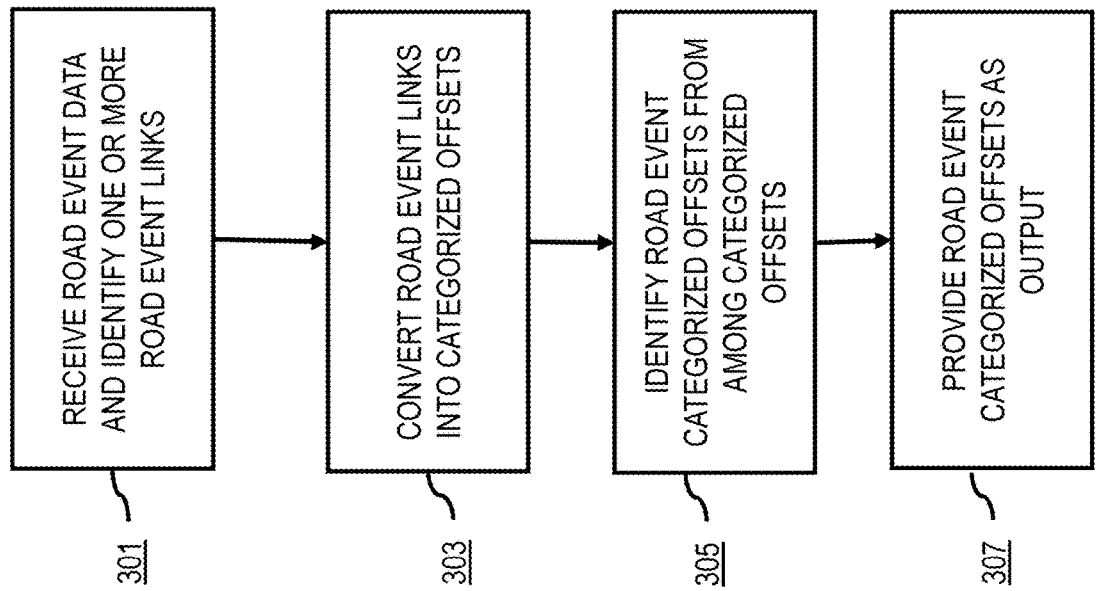
FIGS. 3A-3C are flowcharts of a process for collecting and maintaining road event information, according to one embodiment.
Figure 3B:
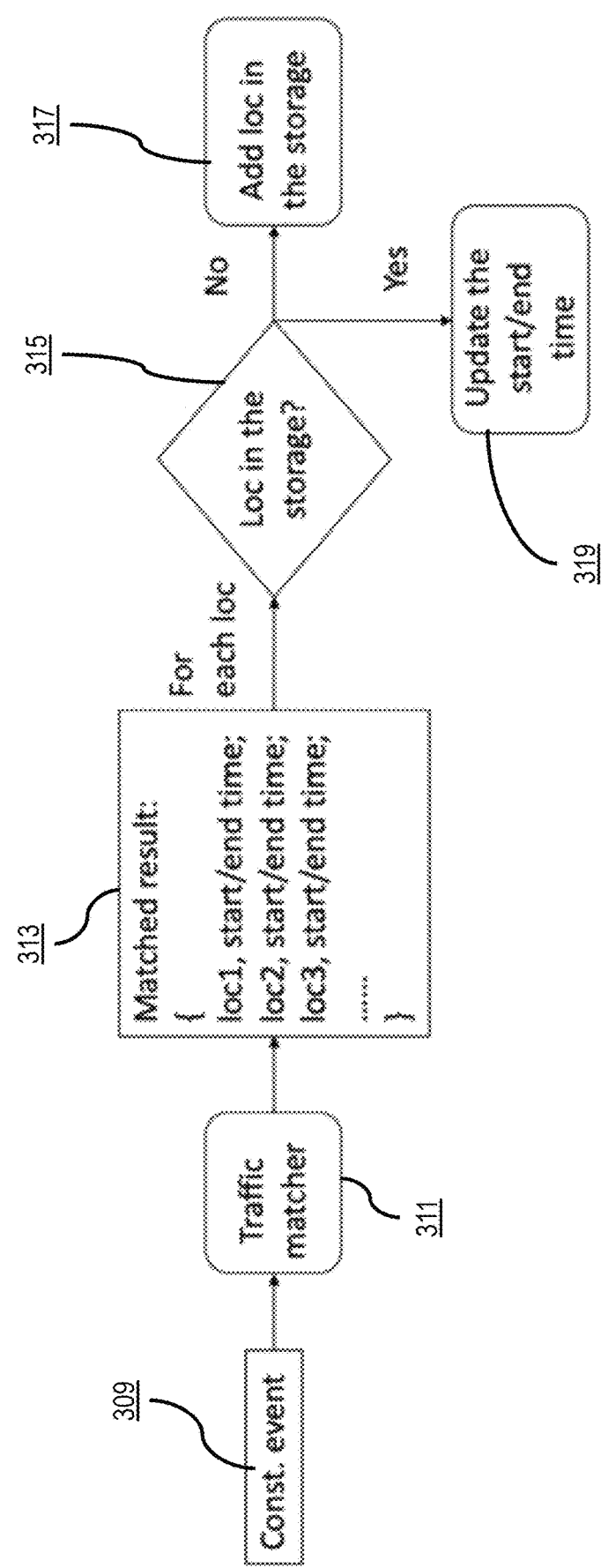
Figure 3C:
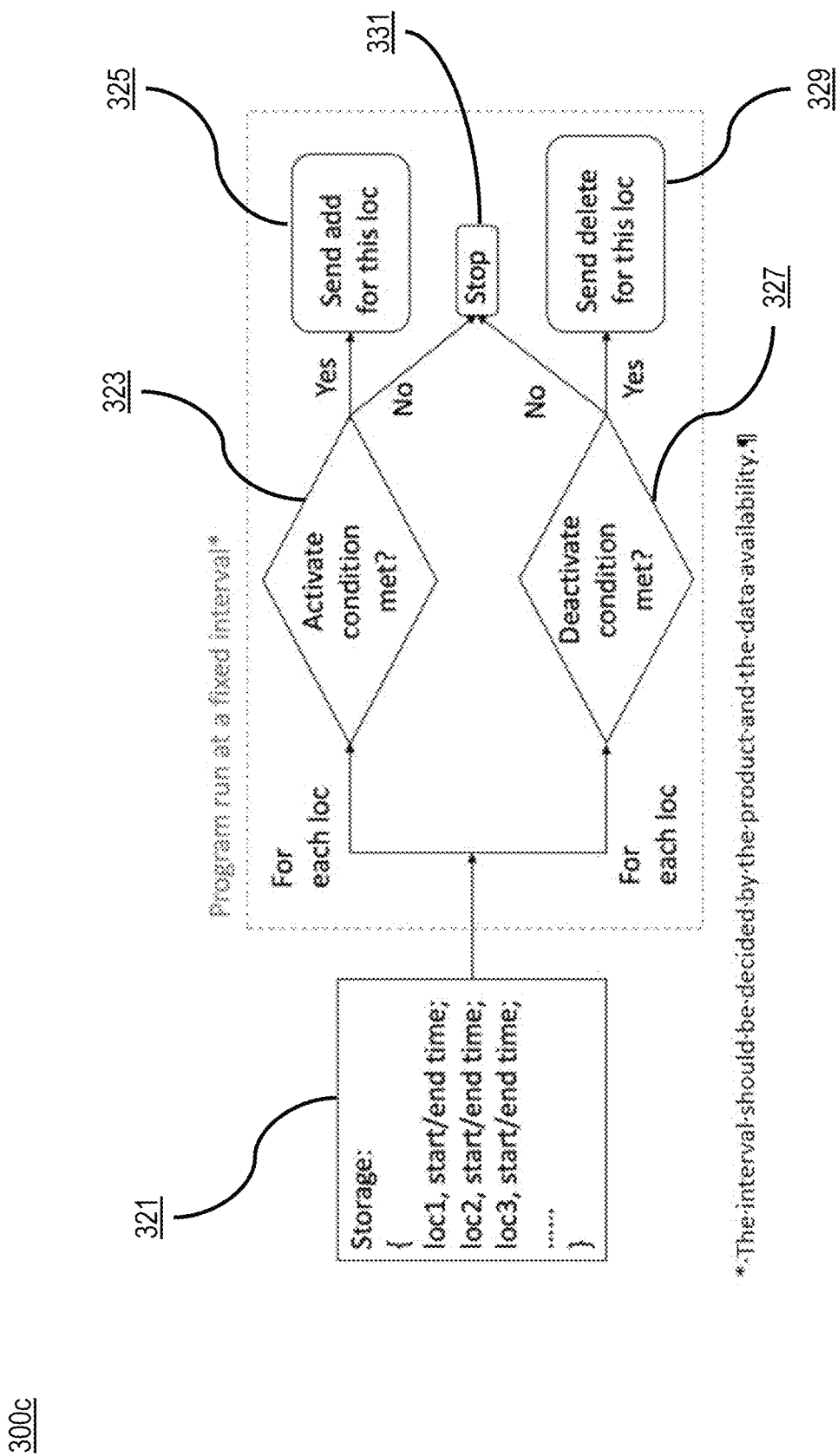

FIGS. 3A-3C are flowcharts of a process for receiving, updating, and storing road event information, according to an example embodiment. In one embodiment, the road event platform 107 performs the process 300 and is implemented in, for instance, a chip set including a processor and a memory as shown FIG. 7.

In FIG. 3A, in flowchart 300*a* in step 301, the road event retrieval module 203 on road event platform 107 receives road event information through communication network 109 from one or more transportation authorities, one or more construction companies, and/or any of content providers 119*a-n* and/or services 117*a-n* that may provide road event information and/or from sensors 105*a-n* associated with vehicles 103*a-n*. Data processing module 201 identifies road event links from conventional road event location data. Conventional road event location information identifies the location of a road event by a starting point and ending point on a link representation of a road. The starting point is represented as a point on a link a distance from the starting node. The road event ending point is downstream of the starting point and is represented as a point on the same or a different link, such that the event may be represented as a portion of a link, a portion of each of two consecutive links, or a downstream portion of a first link, one or more intermediate links, and the upstream portion of a last link. A link comprising all or a portion of a road event is designated as a road event link herein.

In step 303, categorization module 205 converts road event links into categorized offsets, starting at the starting node of each road event link. The one or more categorized offsets have a discreet interval, except that a final categorized offset is less than the discreet interval if the ending node is reached prior to the discreet interval. The categorized offsets have a discrete interval based on a selected precision, the availability of data, or a combination thereof. The interval of the categorized offset should be greater than or equal to two times the desired precision measurement. As depicted here, road event links are converted into categorized offsets based on the receipt of new road event data. However, it should be understood that this conversion can be performed at any time before or after step 301 and/or on any link in a representation of a road, the only prerequisite for such conversion being identification of a link for which such conversion is desired. Conversion of links to categorized offsets can be done in association with receipt of road event data or independently from receipt of road event data, the common aspect being that multiple sets of road event data over time associated with one or more road links will be translated in the same categorized offsets into which those one or more road links have been subdivided.

In step 305, road event categorized offsets are selected from among the categorized offsets associated with the road event links. Road event categorized offsets are categorized offsets that contain the starting point and/or the ending point of the road event, and any categorized offsets disposed between the starting point and/or the ending point of the road event. In addition to a location defined by a starting point and an ending point, road event data can also include other attributes associated with the road event, such as, but not limited to, a construction start date, a construction end date, and a number of data feeds. Such additional road event attributes are added to each of the adjacent categorized offset using data processing module 201.

In step 307, the one or more adjacent road event categorized offsets, along with any other attributes associated with the relevant road event, are each recorded in a record by output module 209. An initial record is delivered to the road event storage database 101 by communication module 211.

In FIG. 3B, in flowchart 300*b* in step 309, a second road event data (road event information received at a time later than the initial road event data) is received by road event retrieval module 203 on road event platform 107 through communication network 109 from one or more transportation authorities, one or more construction companies, and/or any of content providers 119*a-n* and/or services 117*a-n* that may provide road event information and/or from sensors 105*a-n* associated with vehicles 103*a-n*.

In step 311, categorization module 205 converts second road event links into second categorized offsets, or alternatively, references categorized offsets previously created for the relevant links. Second road event categorized offsets are selected from among the second categorized offsets associated with the second road event links, from among the first categorized offsets associated with the relevant links now identified as road event links, or from among categorized offsets were determined prior to collection of any road event data and are associated with the relevant links now identified as road event links. That is to say, that the timing of the conversion of relevant links to categorized offsets is not important. It is important, however, that the interval and location of categorized offsets associated with any specific link are the same for any road events associated with such specific link and for which road event data is to be compared. Any additional road event attributes are added to each of the adjacent categorized offset using data processing module 201.

In step 313, the one or more adjacent second road event categorized offsets, along with any other attributes associated with the relevant road event, are each recorded in a second record by output module 209.

In step 315, a second record produced by the output module 209 is compared using analysis module 207 to a record retrieved from road event storage database 101 by communication module 211. If the link location of the categorized offset associated with the second record matches the link location of the categorized offset associated with the record retrieved from road event storage database 101 by communication module 211, the process proceeds to step 319. In some embodiments, heading or travel direction information is also associated with the link location of categorized offsets. New road event data from sensors on a vehicle may represent geographic coordinates and an associated travel direction. System 100 could be configured to match such sensor data to a categorized offset location if both geographic coordinates and heading were within selected distance and angular thresholds, respectively. If the link location of the categorized offset associated with the second record does not match the link location of the categorized offset associated with the record retrieved from road event storage database 101 by communication module 211, the process proceeds to step 317.

In step 317, the second record produced by the output module 209, and for which no existing record was identified as having a matching categorized offset link location, is added to road event storage database 101 as a new record by communication module 211. In some instances, a new record is indicative of expansion of scope of a preexisting road event as the new record (i.e., categorized offset link location) is adjacent to one or more records (i.e., categorized offset link locations) associated with an ongoing road event. In some instances, a new record is indicative of a new road event as the new record (i.e., categorized offset link location) is not adjacent to any preexisting records and/or is adjacent to one or more other new records (i.e., categorized offset link locations) associated with a new road event.

In step 319, the first record is updated to match or replaced by the second record produced by the output module 209, and the updated record is returned to the road event storage database 101 by communication module 211. The updated record stored on the road event storage database 101 contains the latest available road event data associated with the matched categorized link location including road event attributes such as, but not limited to construction start date, construction end date, and/or the count of updates associated with such categorized link location.

In FIG. 3C, in flowchart 300c in step 321, either automatically on a preset time interval and/or when prompted by an end-user or an operator of system 100, the communication module 211 retrieves records from the road event storage database 101 for processing by the analysis module 207.

In step 323, the analysis module analyzes the retrieved record to determine if the record satisfies an activation condition. In one instance, for a record residing only on the inactive storage layer, if time has passed such that the current date now meets or exceeds the road event starting date, an activation condition is satisfied. In another instance, for a record residing only on the inactive storage layer, if time has passed such that the current count of observations associated with the record link location now meets or exceeds the threshold for count of observation, an activation condition is satisfied. If an activation condition is so satisfied, the process proceeds to step 325. If an activation condition is not met, the process proceeds to step 331. Individual records (i.e., different categorized offset locations) associated with the same road event may be subject to different activation conditions at different times.

In step 325, the record is activated by output module 209 and the active status of the road event and associated road event attributes at the corresponding categorized offset link location associated with the record is added to the active storage layer and is reported by communication module 211 to applications 113a-n on UE 111a-n through communication network 109.

In step 327, the analysis module analyzes the retrieved record to determine if the record satisfies a deactivation condition. In one instance, for a record residing on both the active and inactive storage layers, if time has passed such that the current date now meets or exceeds the road event ending date, a deactivation condition is satisfied. In another instance, for a record residing on both the active and inactive storage layers, if the count of observations associated with the record link location since the last observation falls below a threshold for count of observation, a deactivation condition is satisfied. If the deactivation condition is satisfied, the process proceeds to step 329. If the activation condition is not met, the process proceeds to step 331. Individual records (i.e., different categorized offset locations) associated with the same road event may be subject to different deactivation conditions at different times.

In step 329, the record is deleted from the active storage layer of the road event storage database 101 by communication module 211.

FIGS. 4A-4F each depict examples of the operation of system 100 by showing initial tables of road event categorized offsets, a change in time and/or the addition of new road event information, and updated tables of road event categorized offsets, changed in response to the change in time and/or the addition of new road event information. These examples exemplify the processes of FIG. 3, according to various embodiments.

Figure 4A:
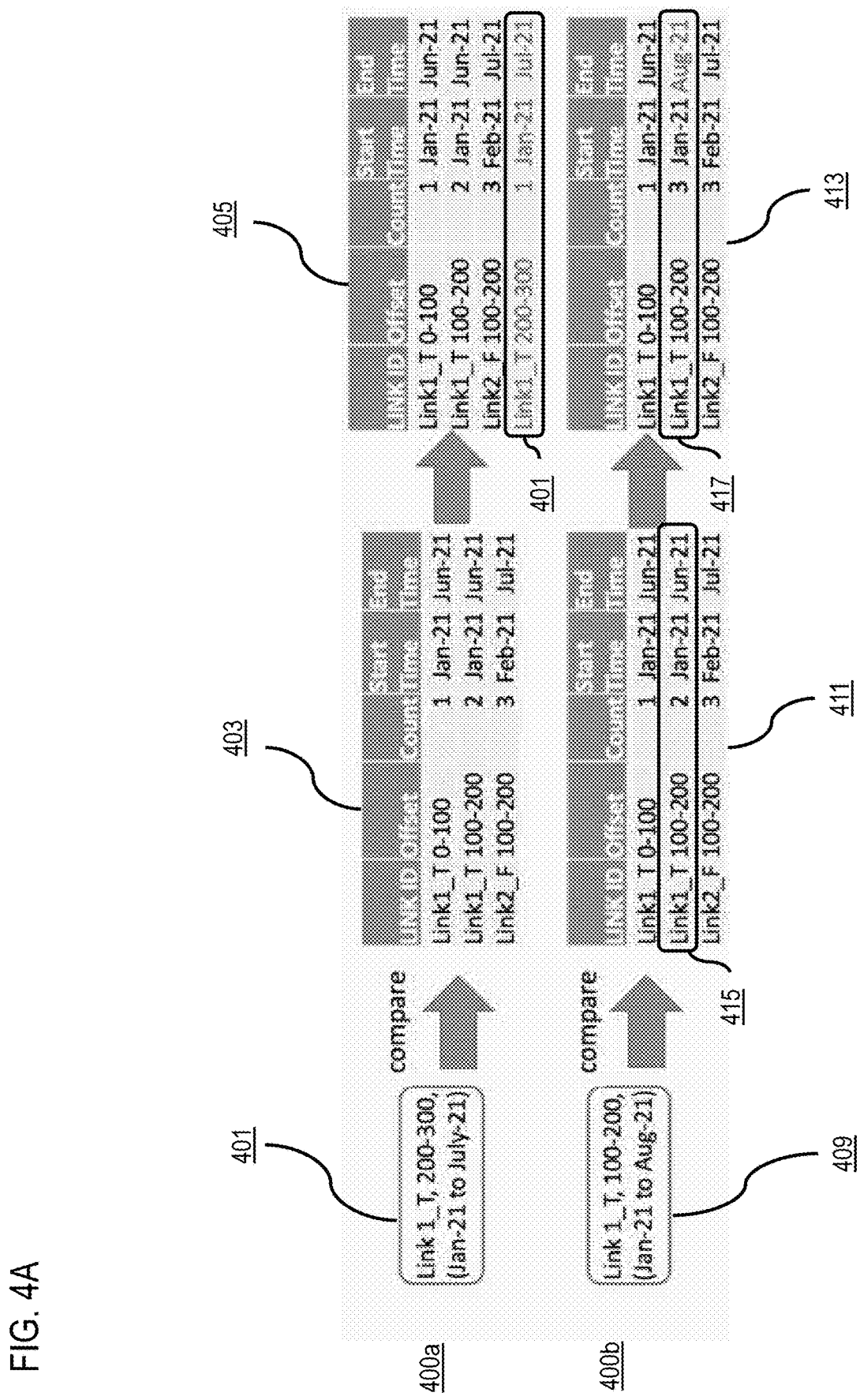

FIG. 4A shows examples 400a and 400b. In example 400a, table 403 shows three road event categorized offset records spanning link locations Link1, 0-100, 100-200, and Link2, 100-200 as being stored in road event storage database 101. Each road event categorized link has an associated start time and end time. Road event retrieval module 203 receives a new record of categorized offset 401. Analysis module 207 compares new record 401 to each record in table 403. No matching link location is detected by analysis module 207, and communication module 211 adds record 401 to table 403 to produce new table 405 in road event storage database 101.

In example 400, table 411 shows three road event categorized offset records spanning link locations Link1, 0-100, 100-200, and Link2, 100-200 as being stored in road event storage database 101. Each road event categorized link has an associated start time and end time. Road event retrieval module 203 receives a new record of categorized offset 409. Analysis module 207 compares new record 409 to each record in table 411 and determines that the link location of new record 409 matches the link location of record 415 in table 411. In response, output module 209 updates record 415 with the new information end time associated with link 409. Communication module 211 sends the updated record to road event storage database 101, wherein table 413 includes updated record 417 (including update of the count of observations and the road event end time) in place of original record 415 in table 411.

FIG. 4B shows example 400c. In example 400c, table 421 shows two road event categorized offset records spanning link locations 0-0.2 and 0.21-0.4 as being stored in road event storage database 101. Each road event categorized link has an associated count, start time, and end time. Road event retrieval module 203 receives a new record of categorized offset 429. Analysis module 207 compares new record 429 to each record in table 421 and determines that the link location of new record 429 matches the link location of the first record in table 421. In response, output module 209 updates count field 425 and end time field 427 in table 421 to count field 431 (indicating that an additional update has occurred at road event categorized link location 0-0.2) and end time field 433 in table 423. Communication module 211 sends the updated record to road event storage database 101, wherein table 423 includes updated fields 431 and 433. The current time is noted as 15 for both tables 421 and 431. Analysis module 207 compares the current time of 15 to the activation condition start times of both records in table 423. Therefore, this road event indicated by the records in table 423 is not reported to applications 113a-n on UE 111a-n. The information in table 423 remains in road event storage database 101.

FIG. 4C shows example 400d. In example 400d, table 441 shows two road event categorized offset records spanning link locations 0-0.2 and 0.2-0.4 as being stored in road event storage database 101. Each road event categorized link has an associated count, start time, and end time. Road event retrieval module 203 receives a new record of categorized offset 429. Analysis module 207 compares new record 445 to each record in table 441 and determines that the link location of new record 445 does not match the link location of either record in table 441. In response, output module 209 adds new record 445 to table 441 to produce table 443 for storage in road event storage database 101. The current time is noted as 40 for table 443. Since time=40 exceeds end time deactivation condition of 25 and 30, none of the records in table 443 are reported to applications 113a-n on UE 111a-n. The information in table 443 remains in road event storage database 101.

FIG. 4D shows example 400e. In example 400e, table 451 shows three road event categorized offset records as being stored in road event storage database 101. Each road event categorized link has an associated count, start time, and end time. Road event retrieval module 203 receives a new record of categorized offset 455. Analysis module 207 compares new record 455 to each record in table 451 and determines that the link location of new record 455 matches the first record in table 451. In response, output module 209 replaces end time field 457 in table 451 to time field 459 in table 453 for storage in road event storage database 101. The current time changes from 20 in table 451 to 21 in table 453. Since start times of 20 and 21 both meet the activation condition of start time greater than or equal to 20, all three records in table 453 remain in an activated road event status and are reportable to applications 113a-n on UE 111a-n. However, the end time is not a change in road event status and is therefore not reported.

FIG. 4E shows example 400f. In example 400f, table 465 shows three road event categorized offset records as being stored in road event storage database 101. Each road event categorized link has an associated count, start time, and end time. Road event retrieval module 203 receives a new record of categorized offset 469. Analysis module 207 compares new record 469 to each record in table 465 and determines that the link location of new record 469 does not match the link location of either record in table 465. In response, output module 209 adds new record 469 to table 465 to produce table 467 for storage in road event storage database 101. The current time is noted as 21 for tables 465 and 467. Since time=21 exceeds start time activation condition of 20, all of the records in table 467 are reportable to applications 113a-n on UE 111a-n. Since record 469 is a new record in road event storage database 101, this new road event activation status is immediately sent by communication module 211 to applications 113a-n on UE 111a-n through communication network 109.

FIG. 4F shows example 400g. In example 400g, table 481 shows three road event categorized offset records as being stored in road event storage database 101. Each road event categorized link has an associated count, start time, and end time. Since current time=21 exceeds start time activation condition of 20, all of the records in table 481 are reportable to applications 113a-n on UE 111a-n. The only change from table 481 to table 483 is a current time change from 21 to 25. Since current time=25 satisfies the deactivation end time condition for the second and third record in table 481, the second and third records are deactivated and omitted from table 483 and therefore not reportable to applications 113a-n on UE 111a-n.

Figure 5:
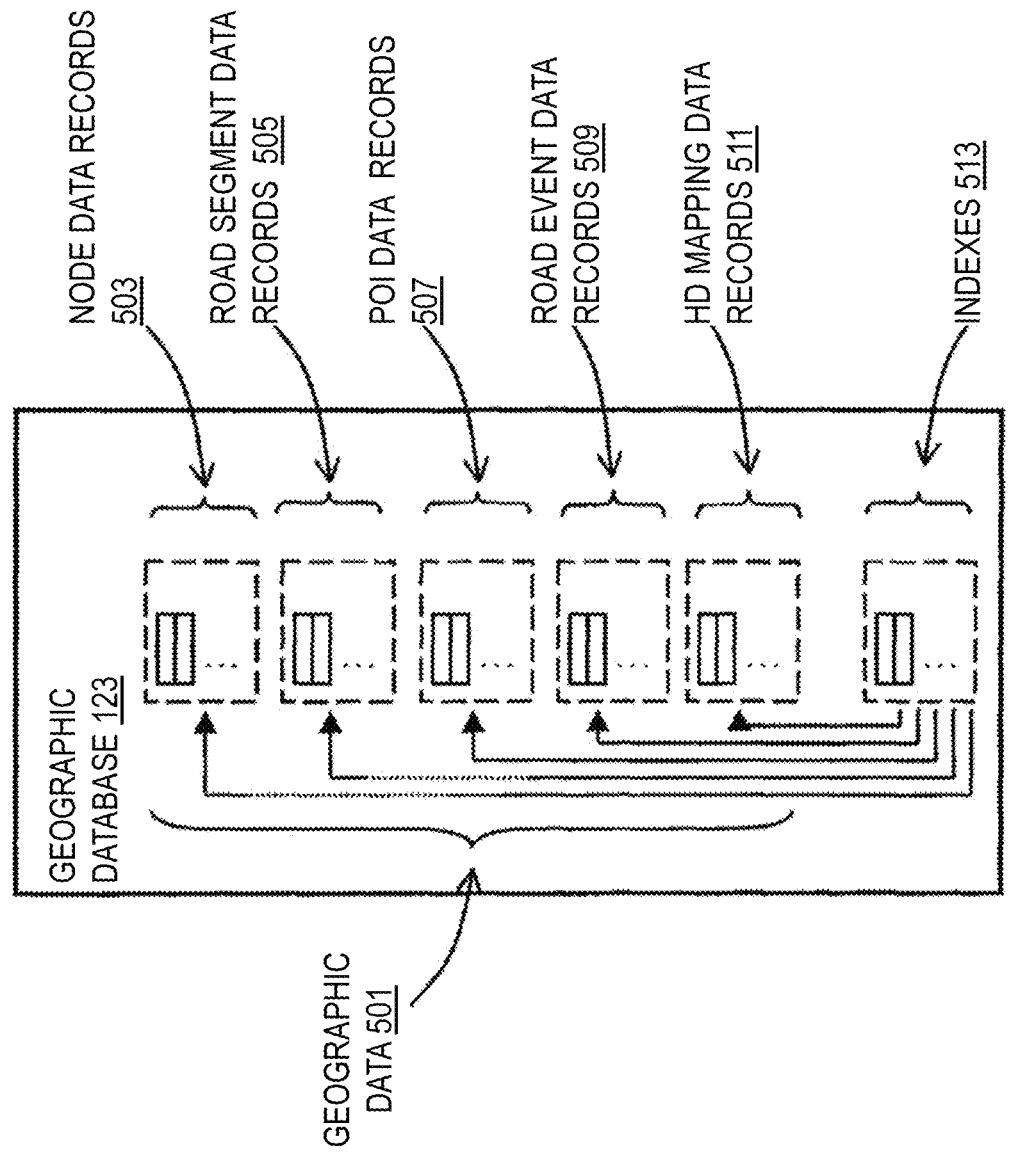
FIG. 5 is a diagram of a geographic database that can be used to implement an embodiment.

FIG. 5 is a diagram of a geographic database (such as the database 123), according to one embodiment. In one embodiment, the geographic database 123 includes geographic data 501 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 511) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge") —A contiguous, non-branching string of one or more line segments terminating in a node at each end.

"Shape point"—A point along a link between two nodes (e.g., used to alert a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 503, road segment or link data records 505, POI data records 507, road event data records 509, HD mapping data records 511, and indexes 513, for example. More, fewer, or different data records can be provided. In one embodiment, additional data records (not shown) can include cartographic ("carto") data records, routing data, and maneuver data. In one embodiment, the indexes 513 may improve the speed of data retrieval operations in the geographic database 123. In one embodiment, the indexes 513 may be used to quickly locate data without having to search every row in the geographic database 123 every time it is accessed. For example, in one embodiment, the indexes 513 can be a spatial index of the polygon points associated with stored feature polygons.

In exemplary embodiments, the road segment data records 505 are links or segments representing roads, streets, or paths, as can be used in the calculated route or recorded route information for determination of one or more personalized routes. The node data records 503 are end points (such as representing intersections, respectively) corresponding to the respective links or segments of the road segment data records 505. The road link data records 505 and the node data records 503 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 507. The geographic database 123 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

In one embodiment, the geographic database 123 can also include road event data records 509 for collecting and maintaining road event information, including, but not limited to, road event information from one or more transportation authorities, one or more construction companies, and/or one or more vehicle sensors, road event links, categorized offsets, and road event categorized offsets, or used by the system 100 according to the various embodiments described herein. By way of example, the line data records 509 can be associated with one or more of the node records 503, road segment records 505, and/or POI data records 507 to support collecting and maintaining road event information, where road event location data is susceptible to location sensor errors, digital map errors, and/or map mismatching errors. In this way, the road event data records 509 can also be associated with or used to classify the characteristics or metadata of the corresponding records 503, 505, and/or 507.

In one embodiment, as discussed above, the HD mapping data records 511 model road surfaces and other map features to centimeter-level or better accuracy. The HD mapping data records 511 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 511 are divided into spatial partitions of varying sizes to provide HD mapping data to vehicles 103a-n and other end-user devices with near real-time speed without overloading the available resources of the vehicles 103a-n and/or devices (e.g., computational, memory, bandwidth, etc. resources).

In one embodiment, the HD mapping data records 511 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 511.

In one embodiment, the HD mapping data records 511 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 115 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103a-n and/or UEs 111a-n along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end-user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicles 103a-n or a UE 111a-n, for example. The navigation-related functions can correspond to vehicle navigation, pedestrian navigation, or other types of navigation. The compilation to produce the end-user databases can be performed by a party or entity separate from the map developer. For example, a customer of the map developer, such as a navigation device developer or other end-user device developer, can perform compilation on a received geographic database in a delivery format to produce one or more compiled navigation databases.

The processes described herein for providing an approach for collecting and maintaining road event information, where road event location data is susceptible to location sensor errors, digital map errors, and/or map mismatching errors, may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
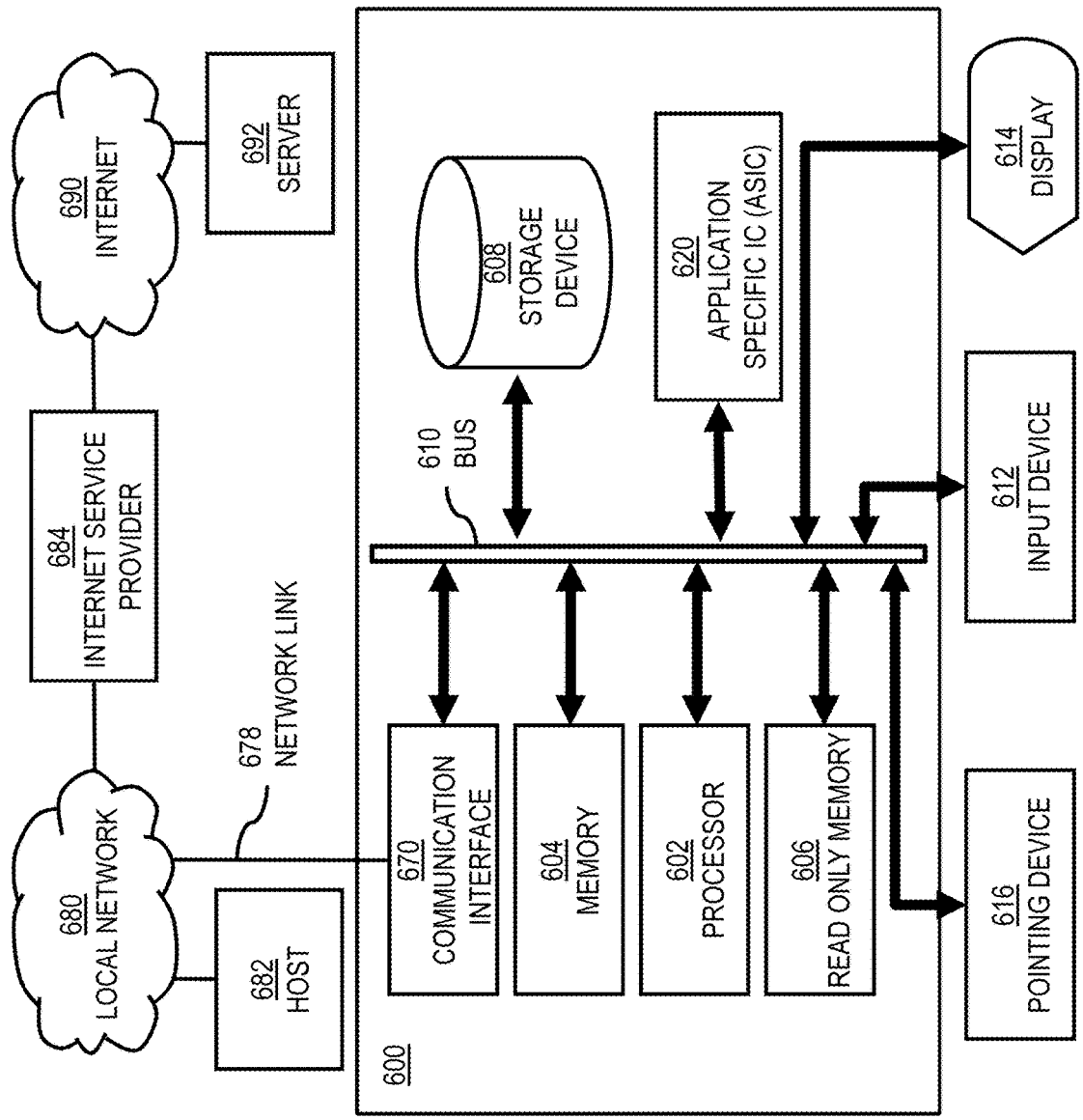
FIG. 6 is a diagram of hardware that can be used to implement an embodiment.

FIG. 6 illustrates a computer system 600 upon which an embodiment of the invention may be implemented. Computer system 600 is programmed (e.g., via computer program code or instructions) to implement an approach for collecting and maintaining road event information, where road event location data is susceptible to location sensor errors, digital map errors, and/or map mismatching errors, as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to an approach for collecting and maintaining road event information, where road event location data is susceptible to location sensor errors, digital map errors, and/or map mismatching errors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for implementing an approach for collecting and maintaining road event information, where road event location data is susceptible to location sensor errors, digital map errors, and/or map mismatching errors. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for an approach for collecting and maintaining road event information, where road event location data is susceptible to location sensor errors, digital map errors, and/or map mismatching errors, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 109 for implementing an approach for collecting and maintaining road event information, where road event location data is susceptible to location sensor errors, digital map errors, and/or map mismatching errors on the UE 111a-n.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

Figure 7:
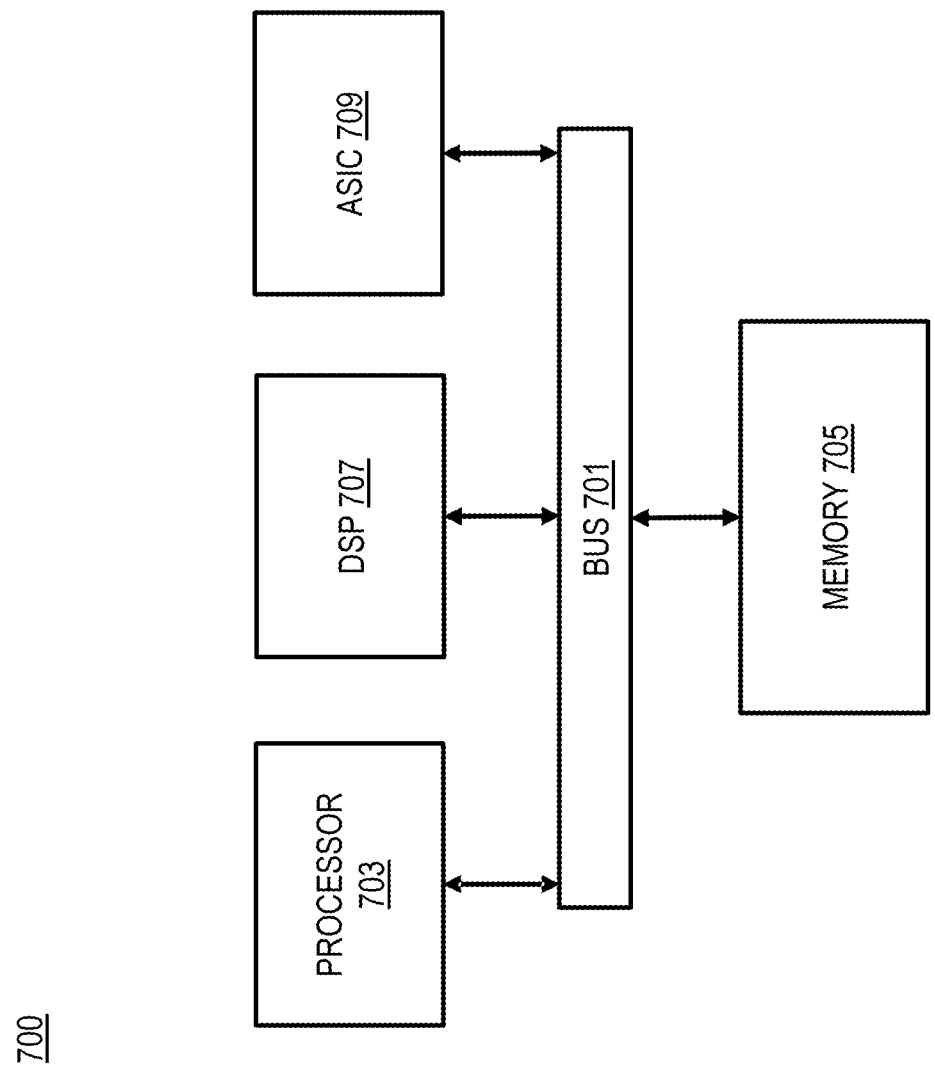
FIG. 7 is a diagram of a chip set that can be used to implement an embodiment.

FIG. 7 illustrates a chip set 700 upon which an embodiment of the invention may be implemented. Chip set 700 is programmed to implement an approach for collecting and maintaining road event information, where road event location data is susceptible to location sensor errors, digital map errors, and/or map mismatching errors, as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively, or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to implement an approach for collecting and maintaining road event information, where road event location data is susceptible to location sensor errors, digital map errors, and/or map mismatching errors. The memory 705 also stores the data associated with or generated by the execution of the inventive steps.

Figure 8:
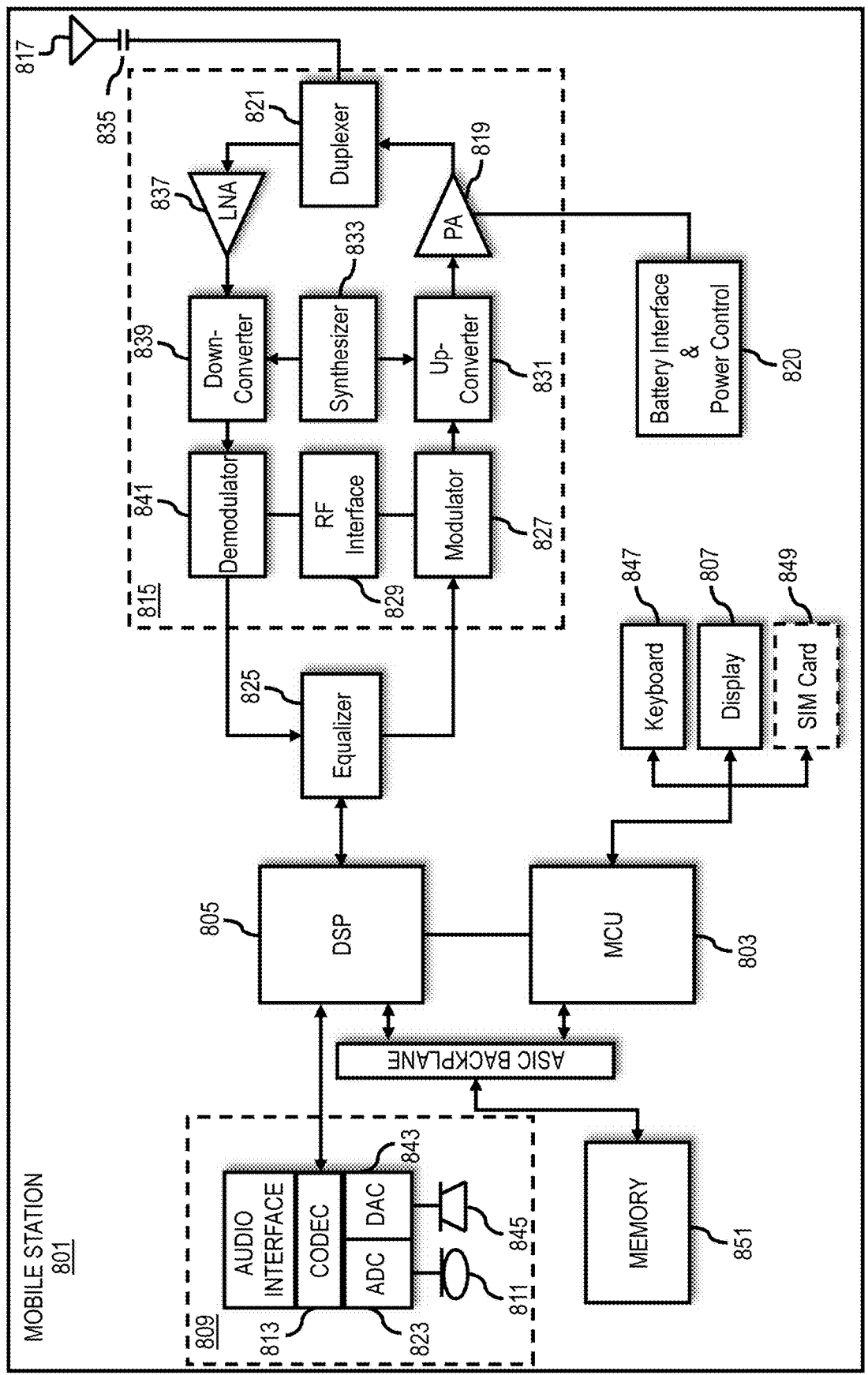
FIG. 8 is a diagram of a mobile station (e.g., handset) that can be used to implement an embodiment.

FIG. 8 is a diagram of exemplary components of a mobile terminal (e.g., handset) capable of operating in the system of FIG. 1A, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to implement an approach for collecting and maintaining road event information, where road event location data is susceptible to location sensor errors, digital map errors, and/or map mismatching errors. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method implemented on one or more processors, the method comprising:
receiving road event data in a plurality of reports from a plurality of sources, wherein the road event data comprises a road event location, wherein the road event location is represented by a first link location, a second link location, and one or more links and/or partial links disposed between the first link location and the second link location, and wherein at least one source of the plurality of sources comprises a plurality of real-time probe points collected using at least one positioning sensor of at least one vehicle;
converting the road event location from each of the plurality of sources to a categorized road event location, wherein the categorized road event location comprises one or more adjacent categorized offsets corresponding to the road event location, wherein the one or more adjacent categorized offsets have a discrete interval that is a fixed length determined based on a midpoint of the discrete interval plus or minus a selected measurement precision, and wherein the discrete interval is used to divide the one or more links and/or partial links such that a remaining length of the one or more links and/or partial links that is not evenly divisible by the fixed length of the discrete interval is used as a length of a last categorized offset of the one or more links and/or partial links;
providing categorized road event data as an output, wherein:
the categorized road event data comprises one or more records corresponding to each of the one or more adjacent categorized offsets;
each of the one or more records comprises a sub-link location of the each of the one or more adjacent categorized offsets corresponding to the each of the one or more records; and
each of the one or more records is associated with an activation condition and/or deactivation condition; and
triggering addition and/or deletion of each of the one or more records to or from an active storage layer of a road event storage database based on the activation condition and/or deactivation condition.

2. The method of claim 1, wherein the discrete interval of the one or more adjacent categorized offsets is determined based on a number of road event observations.

3. The method of claim 1, wherein:
the road event data further comprises a construction start date, a construction end date, and a number of data feeds; and
each of the one or more records further comprises the construction start date, the construction end date, and the number of data feeds.

4. The method of claim 3, further comprising:
adding the one or more records to the road event storage database.

5. The method of claim 4, further comprising:
receiving second road event data comprising a second road event location, a second construction start date, a second construction end date, and a second number of data feeds, wherein the second road event location is represented by a first link location, a second link location, and one or more links and/or partial links disposed between the first link location and the second link location;
converting the second road event location to a categorized second road event location, wherein the categorized second road event location comprises one or more adjacent second categorized offsets corresponding to the second road event location; and
providing categorized second road event data as an output, wherein:
the categorized second road event data comprises one or more second records corresponding to each of the one or more adjacent second categorized offsets; and
each of the one or more second records comprises a sub-link location of the each of the one or more adjacent second categorized offsets corresponding to the each of the one or more second records, a second construction start date, a second construction end date, and a second number of data feeds.

6. The method of claim 5, further comprising:
replacing one or more records with one or more second records if one or more second sub-link locations associated with one or more second records matches one or more sub-link locations associated with one or more records.

7. The method of claim 5, further comprising:
adding one or more second records to the road event storage database records if one or more second sub-link locations associated with one or more second records does not match one or more sub-link locations associated with one or more records.

8. The method of claim 4, further comprising:
comparing one or more records to an activation condition; and
adding one or more records to a construction status report if one or more records satisfies the activation condition.

9. The method of claim 8, wherein:
the activation condition is a construction start date or a minimum number of data feeds.

10. The method of claim 4, further comprising:
comparing one or more records to a deactivation condition; and
deleting one or more records from the road event storage database if one or more records satisfies the deactivation condition.

11. The method of claim 10, wherein:
the deactivation condition is a construction end date or a minimum number of data feeds.

12. An apparatus comprising:
at least one processor; and
at least one memory including computer program code for one or more programs, the at least one memory and the computer program code configured to, with the at least one processor, cause the apparatus to:
receive road event data in a plurality of reports from a plurality of sources, wherein the road event data comprises a road event location, wherein the road event location is represented by a first link location, a second link location, and one or more links and/or partial links disposed between the first link location and the second link location, and wherein at least one source of the plurality of sources comprises a plurality of real-time probe points collected using at least one positioning sensor of at least one vehicle;
convert the road event location from each of the plurality of sources to a categorized road event location, wherein the categorized road event location comprises one or more adjacent categorized offsets corresponding to the road event location, wherein the one or more adjacent categorized offsets have a discrete interval that is a fixed length determined based on a midpoint of the discrete interval plus or minus a selected measurement precision, and wherein the discrete interval is used to divide the one or more links and/or partial links such that a remaining length of the one or more links and/or partial links that is not evenly divisible by the fixed length of the discrete interval is used as a length of a last categorized offset of the one or more links and/or partial links;
provide categorized road event data as an output, wherein:
the categorized road event data comprises one or more records corresponding to each of the one or more adjacent categorized offsets;
each of the one or more records comprises a sub-link location of the each of the one or more adjacent categorized offsets corresponding to the each of the one or more records; and
each of the one or more records is associated with an activation condition and/or deactivation condition; and
trigger addition and/or deletion of each of the one or more records to or from an active storage layer of a road event storage database based on the activation condition and/or deactivation condition.

13. The apparatus of claim 12, wherein the apparatus is further caused to:
receive second road event data comprising a second road event location, a second construction start date, a second construction end date, and a second number of data feeds, wherein the second road event location is represented by a first link location, a second link location, and one or more links and/or partial links disposed between the first link location and the second link location;
convert the second road event location to a categorized second road event location, wherein the categorized second road event location comprises one or more adjacent second categorized offsets corresponding to the second road event location; and
provide categorized second road event data as an output, wherein:
the categorized second road event data comprises one or more second records corresponding to each of the one or more adjacent second categorized offsets; and
each of the one or more second records comprises a sub-link location of the each of the one or more adjacent second categorized offsets corresponding to the each of the one or more second records, a second construction start date, a second construction end date, and a second number of data feeds.

14. The apparatus of claim 13, wherein the apparatus is further caused to:
replace one or more records with one or more second records if one or more second sub-link locations associated with one or more second records matches one or more sub-link locations associated with one or more records.

15. The apparatus of claim 13, wherein the apparatus if further caused to:
add one or more second records to the road event storage database records if one or more second sub-link locations associated with one or more second records does not match one or more sub-link locations associated with one or more records.

16. The apparatus of claim 12, wherein the apparatus if further caused to:
compare one or more records to an activation condition; and
add one or more records to a construction status report if one or more records satisfies the activation condition.

17. The apparatus of claim 12, wherein the apparatus if further caused to:
compare one or more records to a deactivation condition; and
delete one or more records from the road event storage database if one or more records satisfies the deactivation condition.

18. A method implemented on one or more processors, the method comprising:
receiving road event data in a plurality of reports from a plurality of sources, wherein at least one source of the plurality of sources comprises a plurality of real-time probe points collected using at least one positioning sensor of at least one vehicle, and wherein the road event data indicates a road event occurring at an event location specified on a representation of a road by (i) a road event starting point, (ii) a road event ending point, and (iii) one or more full and/or partial links disposed between the road event starting point and the road event ending point, wherein:
the road event starting point is indicated by a first offset distance value on a first link;
the road event ending point is indicated by a second offset distance value on the first link or a second link; and
the first link and, if applicable, the second link and one or more links disposed between the first link and the second link, are identified as one or more road event links, each having a starting node and an ending node;

converting each of the one or more road event links into one or more adjacent categorized offsets starting at the starting node of the each road event link, wherein the one or more categorized offsets have a discrete interval that is a fixed length that is used to divide the first like, the second link, and the one or more links disposed between the first link and the second link, except that a final categorized offset is less than the discrete interval if the ending node is reached prior to the discrete interval, and wherein the discrete interval is determined based on a midpoint of the discrete interval plus or minus a selected measurement precision;

identifying one or more road event categorized offsets from among the one or more categorized offsets within each of the one or more road event links, wherein the one or more road event categorized offsets comprise i) the one or more categorized offsets comprising the road event starting point and/or the road event ending point and ii) the one or more categorized offsets disposed between the road event starting point and the road event ending point;

providing categorized road event data as an output, wherein:
the categorized road event data comprises one or more records corresponding to each of the one or more categorized offsets;
each of the one or more records comprises a sub-link location of the each of the one or more categorized offsets corresponding to the each of the one or more records; and
each of the one or more records is associated with an activation condition and/or deactivation condition; and triggering addition and/or deletion of each of the one or more records to or from an active storage layer of a road event storage database based on the activation condition and/or deactivation condition.

19. The method of claim 18, further comprising:

receiving second road event data comprising a second construction start date, a second construction end date, and a second number of data feeds, wherein the second road event data indicates a second road event occurring at an event location specified on a representation of a road by (i) a second road event starting point, (ii) a second road event ending point, and (iii) one or more full and/or partial links disposed between the second road event starting point and the second road event ending point, wherein:

the second road event starting point is indicated by a first offset distance value on a first link;
the second road event ending point is indicated by a second offset distance value on the first link or a second link; and
the first link and, if applicable, the second link and one or more links disposed between the first link and the second link, are identified as one or more second road event links, each having a starting node and an ending node;

converting each of the one or more second road event links into one or more adjacent second categorized offsets starting at the starting node of the each second road event link, wherein the one or more second categorized offsets have a discrete interval, except that a final second categorized offset is less than the discrete interval if the ending node is reached prior to the discrete interval;

identifying one or more second road event categorized offsets from among the one or more second categorized offsets within each of the one or more second road event links, wherein the one or more second road event categorized offsets comprise i) the one or more second categorized offsets comprising the second road event starting point and/or the second road event ending point and ii) the one or more second categorized offsets disposed between the second road event starting point and the second road event ending point; and providing second categorized road event data as an output, wherein:
the second categorized road event data comprises one or more second records corresponding to each of the one or more second categorized offsets; and
each of the one or more second records comprises a second sub-link location of the each of the one or more second categorized offsets corresponding to the each of the one or more records, a second construction start date, the second construction end date, and the second number of data feeds.

20. The method of claim 19, further comprising:

replacing one or more records with one or more second records if one or more second sub-link locations associated with one or more second records matches one or more sub-link locations associated with one or more records; or adding one or more second records to the road event storage database records if one or more second sub-link locations associated with one or more second records does not match one or more sub-link locations associated with one or more records.

* * * * *